(12) United States Patent
Mitchell

(10) Patent No.: US 9,866,822 B1
(45) Date of Patent: Jan. 9, 2018

(54) THREE DIMENSIONAL DISPLAYS

(71) Applicant: James P. Mitchell, Cedar Rapids, IA (US)

(72) Inventor: James P. Mitchell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 123 days.

(21) Appl. No.: 14/715,354

(22) Filed: May 18, 2015

(51) Int. Cl.
- *G09G 5/00* (2006.01)
- *H04N 13/04* (2006.01)
- *G06T 7/00* (2017.01)
- *G09G 5/02* (2006.01)

(52) U.S. Cl.
CPC ....... *H04N 13/0402* (2013.01); *G06T 7/0051* (2013.01); *G09G 5/02* (2013.01); *H04N 13/0422* (2013.01)

(58) Field of Classification Search
CPC ............ G09C 5/00; H04N 21/234327; H04N 21/2347; H04N 21/4405; H04N 21/631; H04N 7/1675
See application file for complete search history.

(56) References Cited

U.S. PATENT DOCUMENTS 9,642,363 B2   5/2017 Koehler et al.

2011/0116049 A1*  5/2011 Nayar ................ H04N 13/0242
                                                          353/7

OTHER PUBLICATIONS

M. Khizar et al. Nitride deep-ultraviolet light-emitting diodes with microlens array, Applied Physics Letters 86, 173504 (2005), 3 pages.

* cited by examiner

*Primary Examiner* — Insa Sadio
(74) *Attorney, Agent, or Firm* — Angel N. Gerdzhikov; Donna P. Suchy; Daniel M. Barbieri

(57) ABSTRACT

Three-dimensional (3D) displays and methods for controlling the displays are disclosed. A display may include an n-layered 3D column, wherein each i-th layer of the n-layered 3D column includes a group of at least one illuminable element uniquely positioned within the n-layered 3D column. The display may also include a 2D macro-pixel configured to control a depth of illumination within the n-layered 3D column. The macro-pixel may include n-number of control groups, and each i-th control group of the n-number of control groups may include at least one individual pixel uniquely positioned to selectively provide at least one directional beam toward the group of at least one illuminable element positioned in the i-th layer of the n-layered 3D column, thereby allowing the macro-pixel to control the depth of illumination within the n-layered 3D column by selectively engaging at least one of the n-number of control groups of the macro-pixel.

20 Claims, 24 Drawing Sheets

FIG. 5

| RED IN LAYER 4 | GREEN IN LAYER 4 | BLUE IN LAYER 4 | RED IN LAYER 8 | GREEN IN LAYER 5 | BLUE IN LAYER 5 | RED IN LAYER 3 |
|---|---|---|---|---|---|---|
| GREEN IN LAYER 1 | BLUE IN LAYER 4 | RED IN LAYER 1 | GREEN IN LAYER 7 | BLUE IN LAYER 7 | RED IN LAYER 2 | |
| BLUE IN LAYER 1 | RED IN LAYER 1 | GREEN IN LAYER 7 | BLUE IN LAYER 7 | RED IN LAYER 2 | | |

THREE DIMENSIONAL DISPLAYS

CROSS-REFERENCE TO RELATED APPLICATIONS

This application is related to co-pending U.S. patent application Ser. No. 14/676,014 filed on Apr. 1, 2015 and entitled "Systems and Methods for Transmission of Synchronized Physical and Visible Images for Three Dimensional Display," which is incorporated herein by reference.

BACKGROUND

Traditional two-dimensional (2D) displays present 2D images, which are not capable of providing three-dimensional (3D) immersive experiences. Display techniques known as stereo displays utilize stereopsis for binocular vision to provide illusionary solutions to convey depth perceptions to the viewers. However, stereo displays do not physically render 3D objects and lack certain interactive attributes only provided by physically rendering 3D objects. In addition, some stereo displays require eye glasses that may be lost or damaged, and the eye glasses may also interfere with use of prescription lenses.

Some 3D displays rely on holographic techniques that use image and beam wave interferences and Fresnel lenses to generate virtual images. Such displays generally require viewers to view the images from certain angles. In addition, it is noted that displays using wave interference designs generally lack brightness and definition, and have difficulties implementing high frame rates.

Still another type of 3D display may utilize stacking of multiple liquid crystal display (LCD) layers. Stacked LCDs, however, suffer from severe attenuation progressively through each layer, resulting in reduced image quality.

SUMMARY

An embodiment of the inventive concepts disclosed herein is directed to a display. The display may include an n-layered 3D column, wherein each i-th layer of the n-layered 3D column includes a group of at least one illuminable element uniquely positioned within the n-layered 3D column. The display may also include a 2D macro-pixel configured to control a depth of illumination within the n-layered 3D column. The macro-pixel may include n-number of control groups, and each i-th control group of the n-number of control groups may include at least one individual pixel uniquely positioned to selectively provide at least one directional beam toward the group of at least one illuminable element positioned in the i-th layer of the n-layered 3D column, thereby allowing the macro-pixel to control the depth of illumination within the n-layered 3D column by selectively engaging at least one of the n-number of control groups of the macro-pixel.

An additional embodiment of the inventive concepts disclosed herein is also directed to a display. The display may include an n-layered optical stack defining a plurality of n-layered 3D columns, wherein each i-th layer of each particular n-layered 3D column includes a group of at least one illuminable element uniquely positioned within each particular n-layered 3D column. The display may also include an optical controller including a plurality of 2D macro-pixels. Each particular macro-pixel may uniquely correspond to a particular n-layered 3D column of the n-layered optical stack, and each particular macro-pixel may be configured to control a depth of illumination within the particular n-layered 3D column, wherein each particular macro-pixel includes n-number of control groups, and wherein each i-th control group of each particular macro-pixel includes at least one individual pixel uniquely positioned to selectively provide at least one directional beam toward the group of at least one illuminable element positioned in the i-th layer of the particular n-layered 3D column that uniquely corresponds to the particular macro-pixel, thereby allowing each particular macro-pixel to control the depth of illumination within the particular n-layered 3D column that uniquely corresponds to the particular macro-pixel by selectively engaging at least one of the n-number of control groups of that particular macro-pixel.

A further embodiment of the inventive concepts disclosed herein is directed to a method. The method may include: providing an n-layered 3D column, wherein each i-th layer of the n-layered 3D column includes a group of at least one illuminable element uniquely positioned within the n-layered 3D column; providing a mapping between a 2D macro-pixel and the n-layered 3D column, wherein the macro-pixel includes n-number of control groups, and wherein each i-th control group of the n-number of control groups includes at least one individual pixel uniquely positioned to selectively provide at least one directional beam toward the group of at least one illuminable element positioned in the i-th layer of the n-layered 3D column; and facilitating control of a depth of illumination within the n-layered 3D column by selectively engaging at least one of the n-number of control groups of the macro-pixel.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

The numerous objects and advantages of the inventive concepts disclosed herein may be better understood by those skilled in the art by reference to the accompanying figures in which:

FIG. 5 is an illustration depicting another macro-pixel arrangement;

FIG. 7 is an illustration depicting another macro-pixel arrangement;

FIG. 8 is an illustration depicting another macro-pixel arrangement;

DETAILED DESCRIPTION

Reference will now be made in detail to exemplary embodiments of the inventive concepts disclosed herein, examples of which are illustrated in the accompanying drawings.

Embodiments in accordance with the inventive concepts disclosed herein are directed to 3D display devices that can create/render true 3D representations without the use of wave interference, stacked LCDs, or special lenses. More specifically, a 3D display device in accordance with the inventive concepts disclosed herein may leverage continued advancements in (ultra) high definition 2D display technologies to provide a 2D-to-3D mapping, allowing various illuminable elements suspended within a 3D volume to be selectively engaged or activated to form a true 3D representation. The 2D-to-3D mapping also allows a 3D display device to be driven by a directional bias of light from just one direction, without the need for using multiple interference beams positioned at different angles to help define 3D pixels. The 3D display devices in accordance with the inventive concepts disclosed herein may be implemented or scaled to portable displays (e.g., wearables, phones, head mounted, augmented reality, tablets, personal electronics, and the like), automotive and avionics displays, computer displays, television displays, projection systems, virtual reality displays, theater displays, situational awareness and room displays, as well as various other types of displays.

Figure 1:
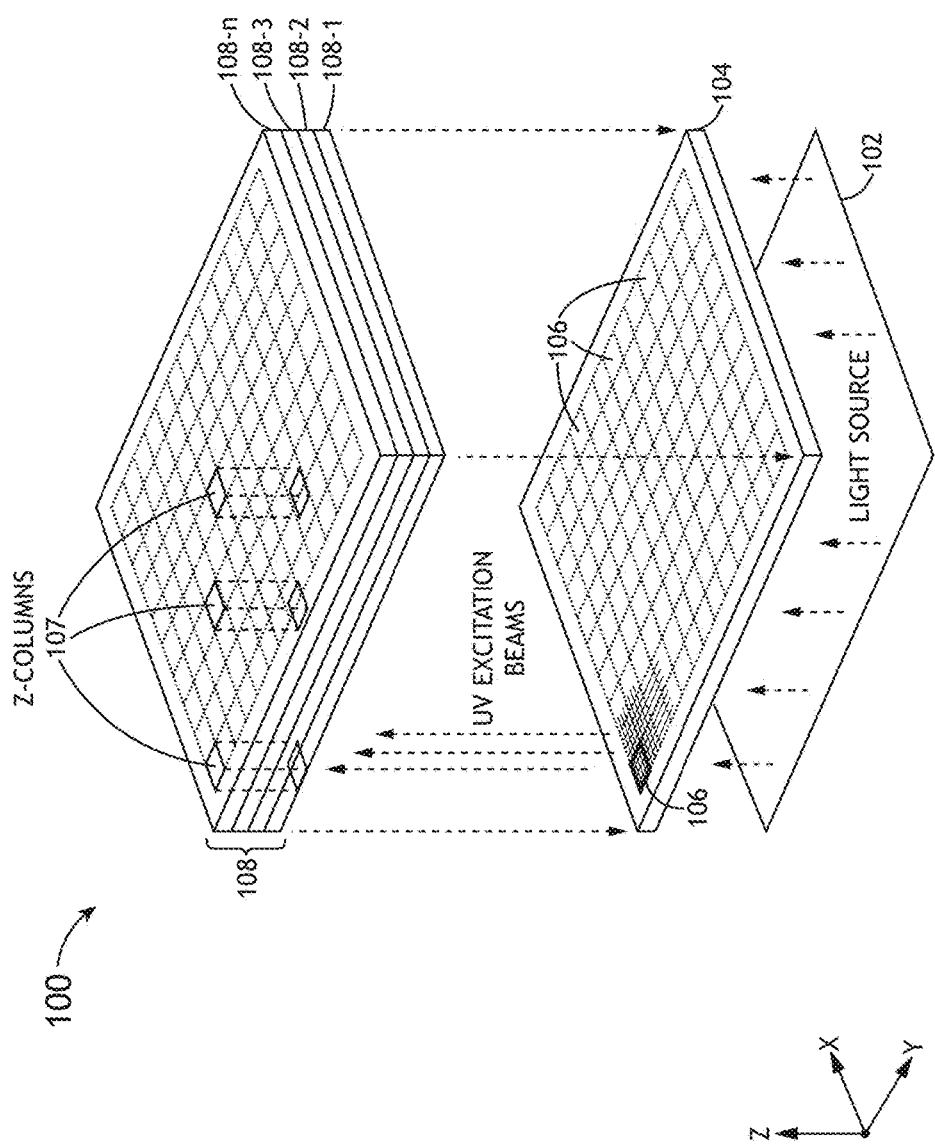
FIG. 1 is an exploded isometric view of a 3D display.
Figure 2:
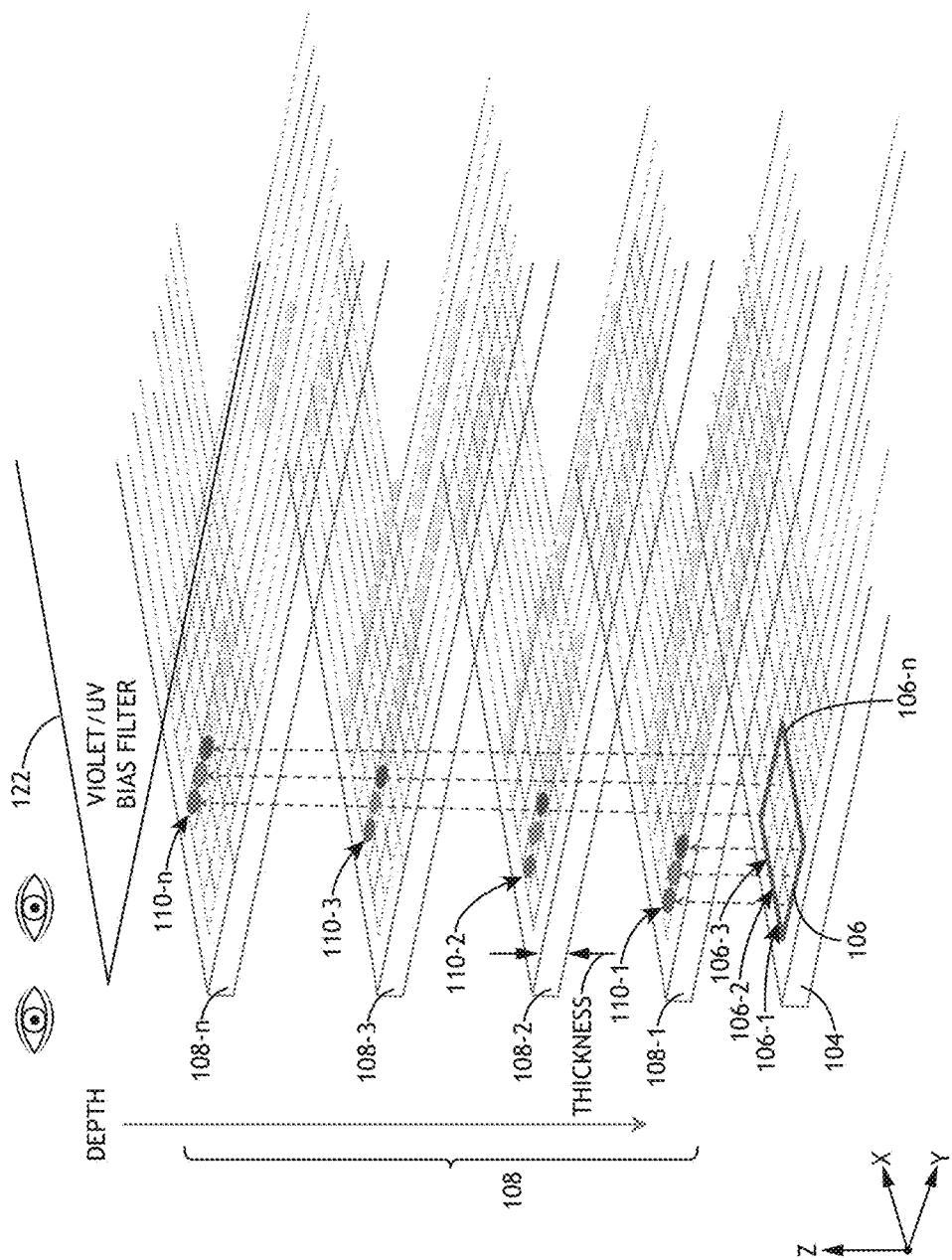
FIG. 2 is a partial exploded view showing a portion of the 3D display of FIG. 1.

Referring generally to FIGS. 1-2, an exemplary embodiment of a 3D display device 100 in accordance with the inventive concepts disclosed herein is shown. The 3D display device 100 may include a light source 102 configured for providing directive (or a coherent) illumination toward an optical stack 108 through a light switch 104. The light source 102 may include a continuous planar source, and may utilize reflectors, projectors, array masks, directors, collimators, beam expanders, filters, absorbers, diffusers, LEDs Lasers, or various other types of light generators and/or light modifiers to help control and distribute the optical energy bias or illumination evenly across the light switch 104. It is to be understood that specific implementations of the light source 102 may vary without departing from the broad scope of the inventive concepts disclosed herein. For instance, the light source 102 may utilize certain transmissive or reflective digital light projectors with spatial light modulators (SLMs) or micro-mirrors as a means for delivering the directive light. The light source 102 may also be optionally configured to include individually switchable or addressable illuminating elements to provide local control and/or enhance black levels.

The light switch 104 may be implemented utilizing any thin panel display that is capable of receiving a control input from a 2-D or 3-D video or graphics processor and selectively blocking or controlling certain portions of the illumination provided by the light source 102 from reaching the optical stack 108. For instance, a black-and-white matrixed SLM or LCD may be utilized to serve as the light switch 104. The various individual pixels of the light switch 104 (e.g., forming logical LCD light switch arrays) may be selectively turned on or off, blocking or letting through the illumination provided by the light source 102 at these corresponding pixels. Alternatively, the LCD light switch 104 may include a non-colorized grayscale display, where each pixel of the LCD light switch 104 may range between black (substantially non-transparent) and white (substantially transparent), allowing the illumination intensity reaching the optical stack 108 to be adjustable at each pixel of the LCD light switch 104. It is contemplated that pixel intensities may also be controlled by driving or modulating the light source 102 (which may be planar or pixilated).

The individual pixels of the LCD light switch 104 may be logically grouped into one or more macro-pixels 106 to facilitate a 2D-to-3D mapping. The term 2D-to-3D mapping refers to a mapping from a 2D space (e.g., x and y axis) to a 3D space (e.g., x, y, and z axis). More specifically, as depicted in FIG. 2, the individual pixels contained within each macro-pixel 106 may be arranged into a plurality of control groups 106-1, 106-2, 106-3, . . . 106-n, and each particular control group, 106-1, 106-2, 106-3, . . . 106-n, may uniquely correspond to a group of illuminable elements 110-1, 110-2, 110-3, . . . 110-n uniquely positioned within one of the optical layers 108-1, 108-2, 108-3, . . . 108-n along the z-axis of the n-layered optical stack 108.

It is noted that each layer 108-i of the n-layered optical stack 108 has a specified thickness or distance between adjacent stack layers, defining a depth in the z-axis direction. It is also noted that each illuminable element group 110-i is positioned within its corresponding layer 108-i in a one-to-one and non-overlapping manner. That is, for the positions occupied by a given illuminable element group 110-i in a layer 108-i, the corresponding positions in layers above and below the layer 108-i will be transparent (a pass through for other layer beams) and will not contain any illuminable element positioned therein. Furthermore, it is noted that the illuminable elements 110 used to form the illuminable groups 110-i may include materials that emit (or re-emit) visible light only when illuminated, but otherwise remains substantially invisible (or transparent). In this manner, if the illumination provided by the light source 102 (planar or pixelated) is allowed to directionally illuminate through a particular control group 106-i, the illumination will then travel orthogonally (or vertically with respect to the orientation shown in the figures) through the n-layered optical stack 108, but will only encounter (illuminate or excite) the illuminable element group 110-i uniquely positioned in layer 108-i, effectively allowing a two-dimensional switching mechanism (i.e., the macro-pixel 106) to control the depth of illumination on the z-axis in a three-dimensional volume (shown as a 3D column, or a "z-column" 107) directly above the macro-pixel 106.

It is contemplated that each particular macro-pixel 106 of the light switch 104 may be configured in the same manner to control a corresponding z-column 107 of the optical stack 108 directly above that particular macro-pixel 106. It is to be understood that the representations of the z-columns 107 in FIG. 1 have been simplified for illustrative purposes. It is contemplated that a large number (e.g., millions) of such z-columns 107 may be defined within the optical stack 108. From a viewer's perspective, each volume of the n-layered optical stack 108 directly above each particular macro-pixel 106 (i.e., each z-column 107) may be perceived as a "3D pixel". It is noted that the perceived 3D pixels are not only defined in the x and y directions, but also defined in the z direction (i.e., n layers). By logically addressing and selectively controlling the light switch 104, the depth of illumination of each discrete 3D pixel in the 3D display device 100 may effectively form or render an image with varying z-axis depth (i.e., a true 3D image) for the viewer.

It is noted that each illuminable element group 110-$i$ in the example shown in FIG. 2 may include a triad grouping of illuminable elements. As mentioned previously, these illuminable elements may include reflective, partially translusive, or otherwise excitable elements that may re-emit light when illuminated. By using different illuminable elements that are capable of re-emitting or producing different colors (e.g., red, green and blue) when illuminated by a common illumination wavelength (as implemented in some embodiments), the resulting perceived 3D pixel color mix may be effectively integrated or colorized in a color space by the viewer at a distance. It is to be understood, however, that the depiction of a triad is merely exemplary. An illuminable element group 110-$i$ (and its corresponding control group 106-$i$) may include four (commonly referred to as "quad") or more elements representing same or additional colors without departing from the broad scope of the inventive concepts disclosed herein. It is also to be understood that an illuminable element group 110-$i$ (and its corresponding control group 106-$i$) may includes less than three illuminable elements without departing from the broad scope of the inventive concepts disclosed herein. For instance, each illuminable element group 110-$i$ may need to include just one illuminable element to produce a monochromic 3D image.

It is also noted that the plurality of control groups 106-1, 106-2, 106-3, . . . 106-$n$ and the plurality of illuminable element groups 110-1, 110-2, 110-3, . . . 110-$n$ are shown to have been arranged as a plurality of rows oriented in a particular direction as depicted in FIG. 2. It is to be understood, however, that such a configuration is merely exemplary. The control groups 106-1, 106-2, 106-3, . . . 106-$n$ and their corresponding illuminable element groups 110-1, 110-2, 110-3, . . . 110-$n$ may be arranged in various other manners as long as each control group 106-$i$ can be mapped/aligned to its corresponding illuminable element group 110-$i$ in a one-to-one and non-overlapping manner. It is contemplated that certain alternative arrangements may even be appreciated.

Figure 3:
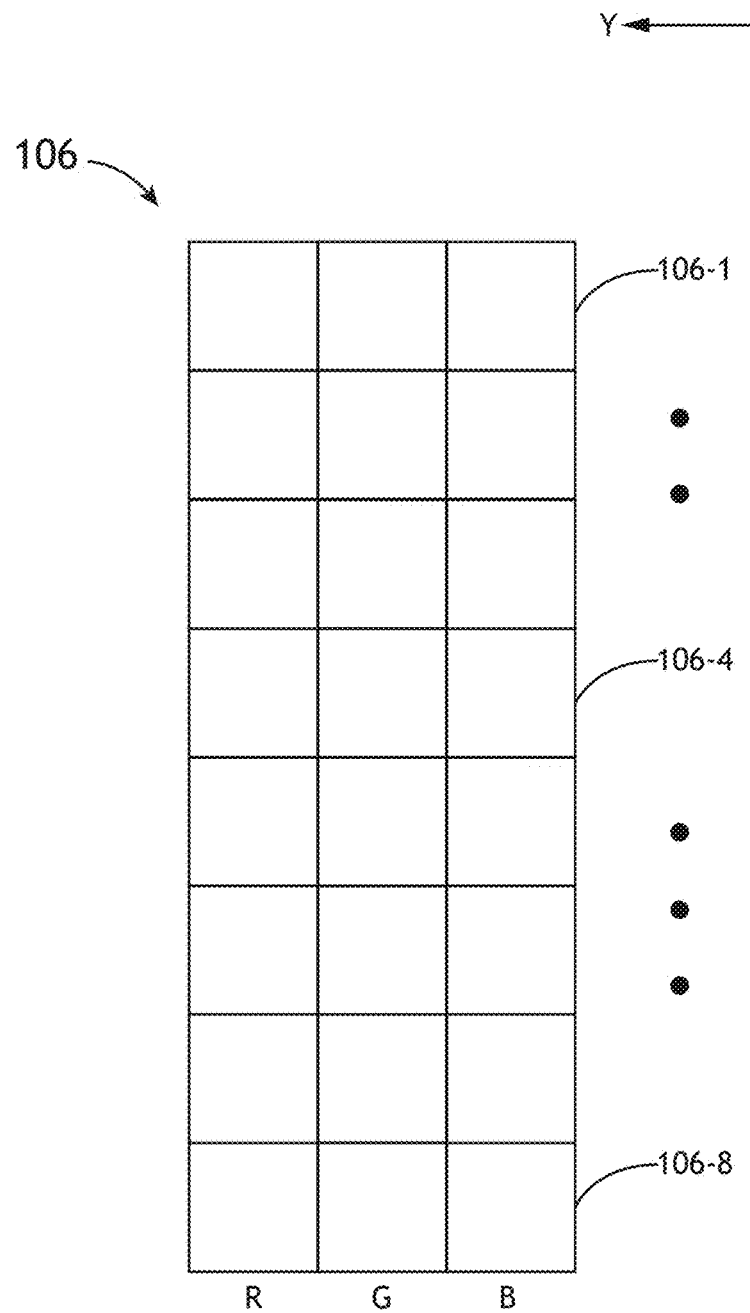
FIG. 3 is an illustration depicting a macro-pixel arrangement.
Figure 4:
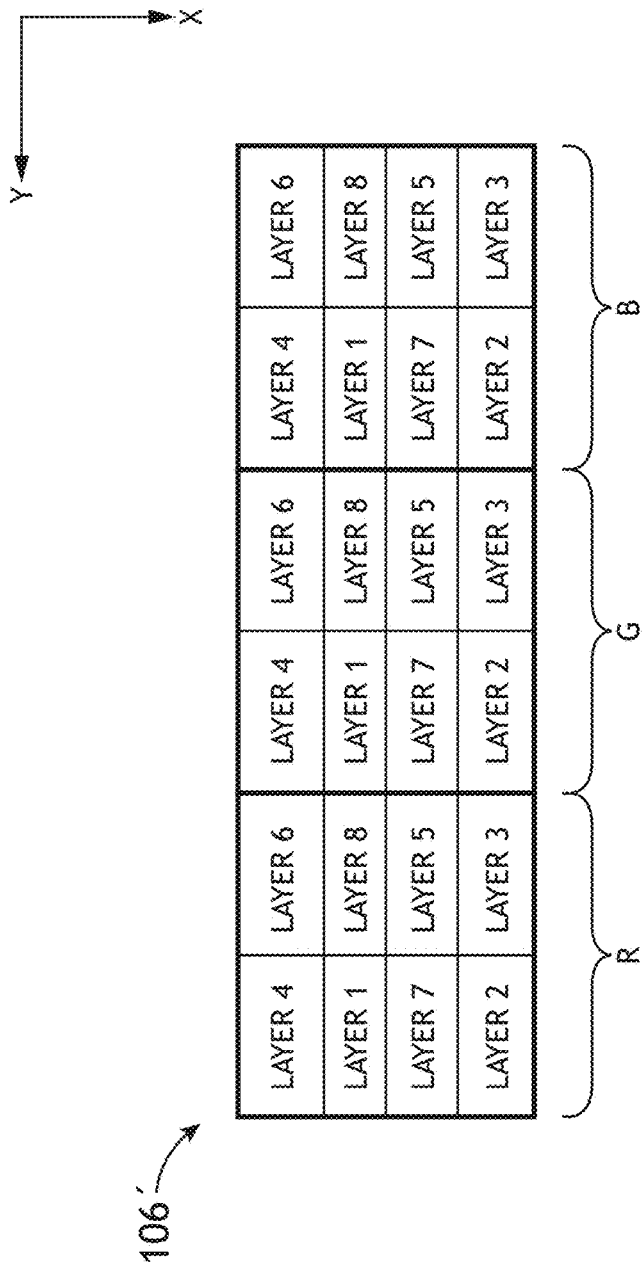
FIG. 4 is an illustration depicting another macro-pixel arrangement.

FIGS. 3 and 4 are illustrations depicting two different arrangements. More specifically, FIG. 3 shows a top view of a macro-pixel 106 containing eight control groups 106-1 through 106-8 arranged in a manner similar to the macro-pixel 106 depicted in FIG. 2. As mentioned previously, the macro-pixel 106 may control the z-axis depth of the perceived 3D pixel (i.e., the z-column) directly above the macro-pixel 106 by controlling the light passing through the control groups 106-1 through 106-8. For illustrative purposes, suppose layer 1 (corresponding to control group 106-1) of the 3D pixel is illuminated at a first time instance, and further suppose that layer 8 (corresponding to control group 106-8) of the 3D pixel is illuminated at the next time instance, the arrangement of the control groups as shown in FIG. 3 may cause the 3D pixel perceived by the viewer to appear as having been shifted in the x-axis direction. While this shift may appear relatively insignificant, it may be noticeable.

FIG. 4 shows an alternative arrangement of a macro-pixel 106'. Compared to FIG. 3, the macro-pixel 106' shown in FIG. 4 uses the same number of individual pixels of the light switch 104 to control the same number of z-axis layers, but because the control groups 106'-1 through 106'-8 may now be randomly distributed (as opposed to arranged in rows), the apparent shifting effect is therefore somewhat disguised or reduced.

Figure 5:
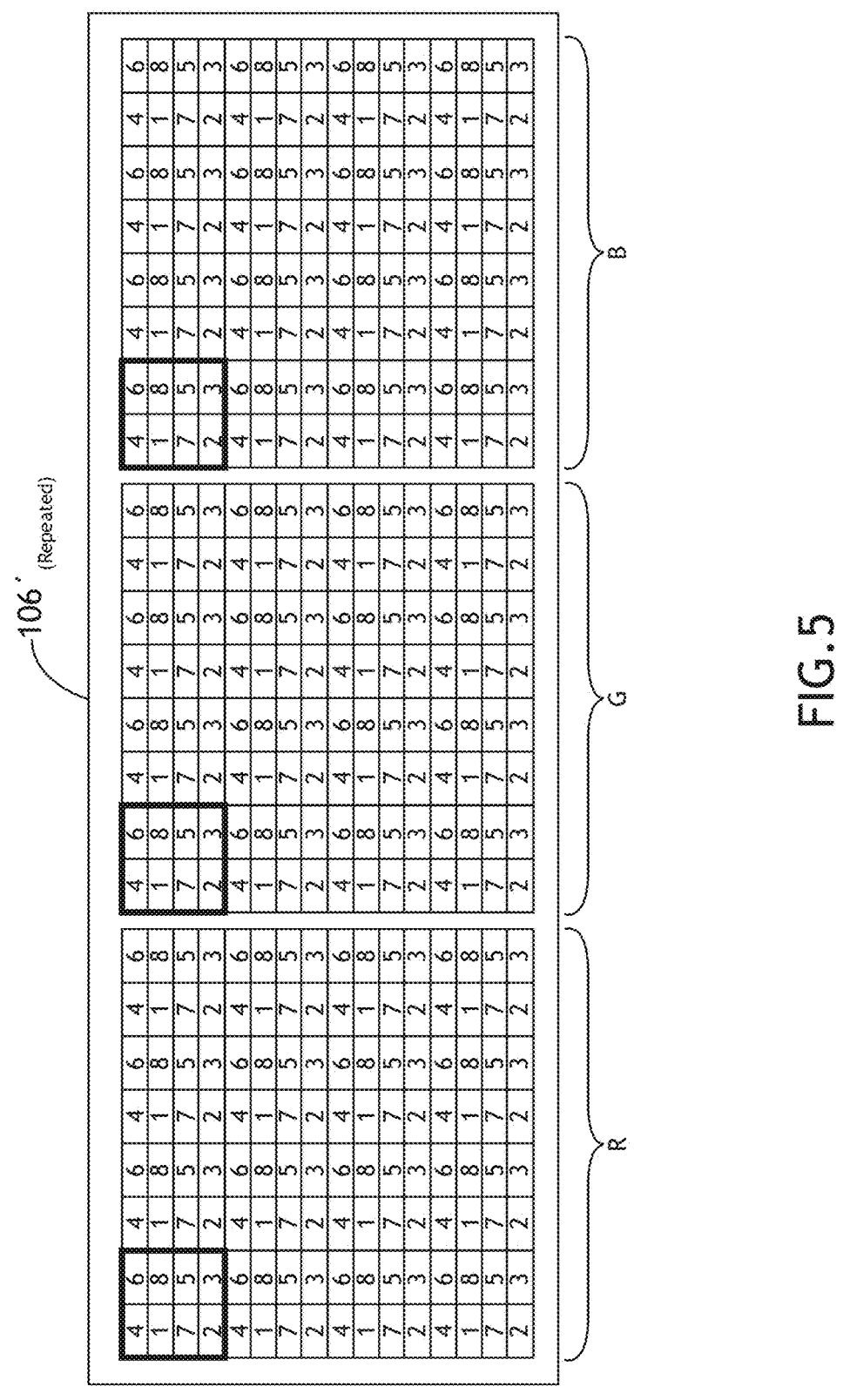
Figure 6:
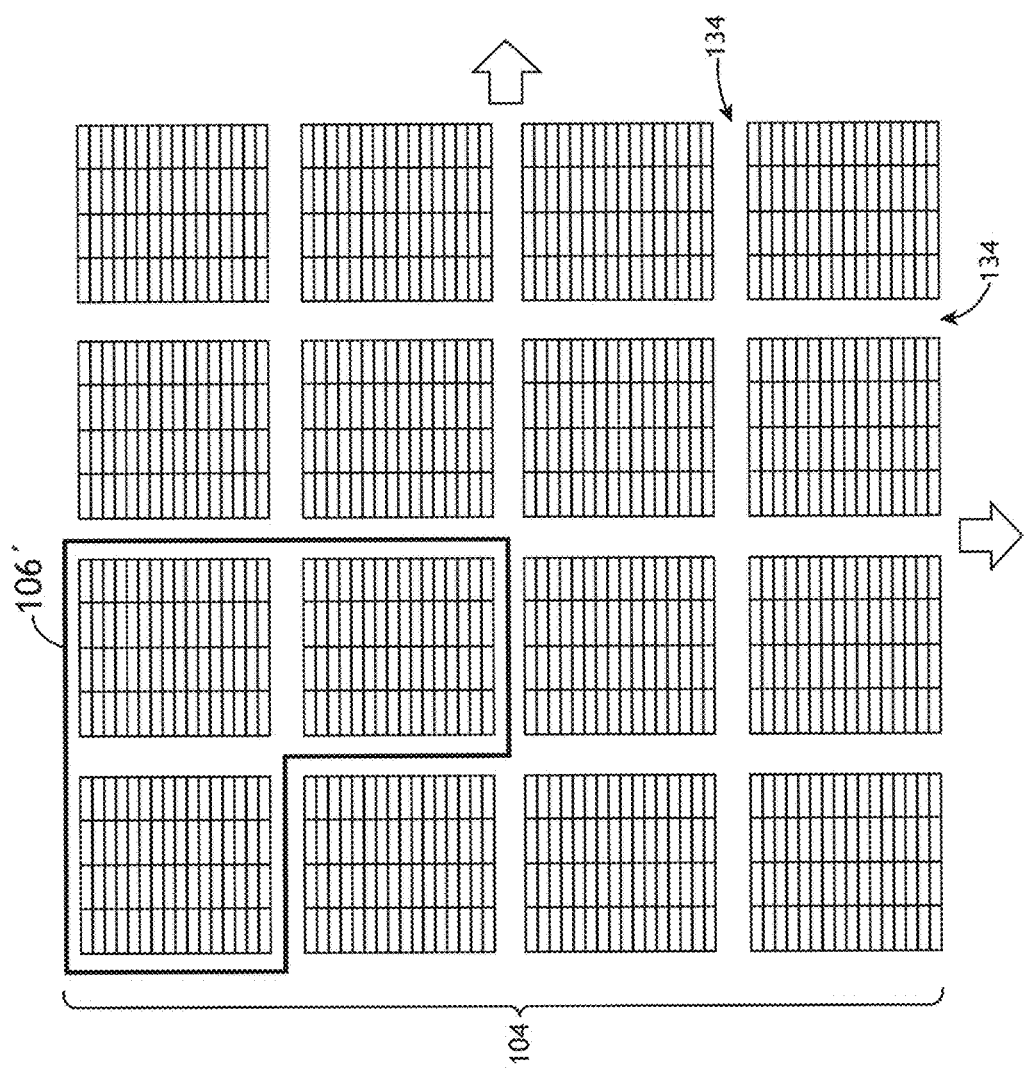
FIG. 6 is an illustration depicting a plurality of macro-pixels of FIG. 5 forming a light switch.

It is contemplated the apparent shifting effect may be further reduced using exemplary arrangements as shown in FIGS. 5 and 6. It is noted that the same pattern illustrated in FIG. 4 is applied in FIG. 5, but repetitions are introduced to the pattern to form more granular, spatially separated and redundantly driven groups in a square or rectangular arrangement. It is noted that an arrangement configured in this manner may in turn provide more granularity to the z-columns, and may therefore help further reduce the perception of the aforementioned shifting effect. It is contemplated that with continued advancements in light modulator and/or pixel drive technologies, more layers may be introduced to the optical stacks 108 and more redundantly driven groupings may be added while simultaneously offering less noticeable pixel shifting. It is contemplated that more granularities provided in the z-columns generally lead to less apparent shifting perceivable by the viewer.

Figures 7, 8:
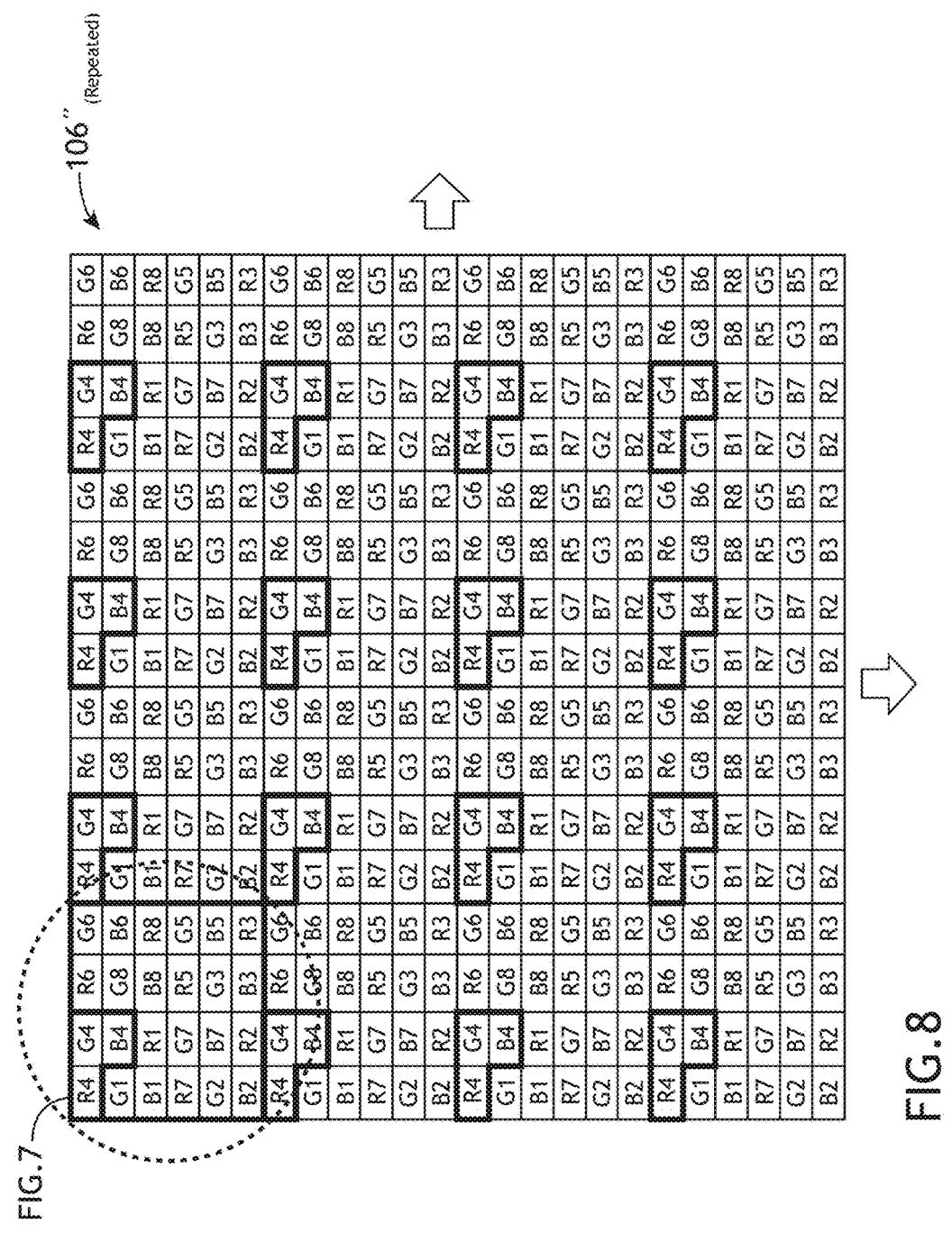

It is also contemplated that the macro-pixels 106 are not required to separate the logical groups of red, green and blue pixels. FIG. 7 is an illustration depicting another alternative arrangement of a macro-pixel 106" where the individual pixels are not grouped by color. More specifically, compared to FIG. 4, the macro-pixel 106" shown in FIG. 7 uses the same number of individual pixels to control the same full extent of the z-axis layers, but the control groups in FIG. 7 are distributed in a manner such that the depth and color mappings are dithered and the z-axis layers and colors are integrated.

Figure 9:
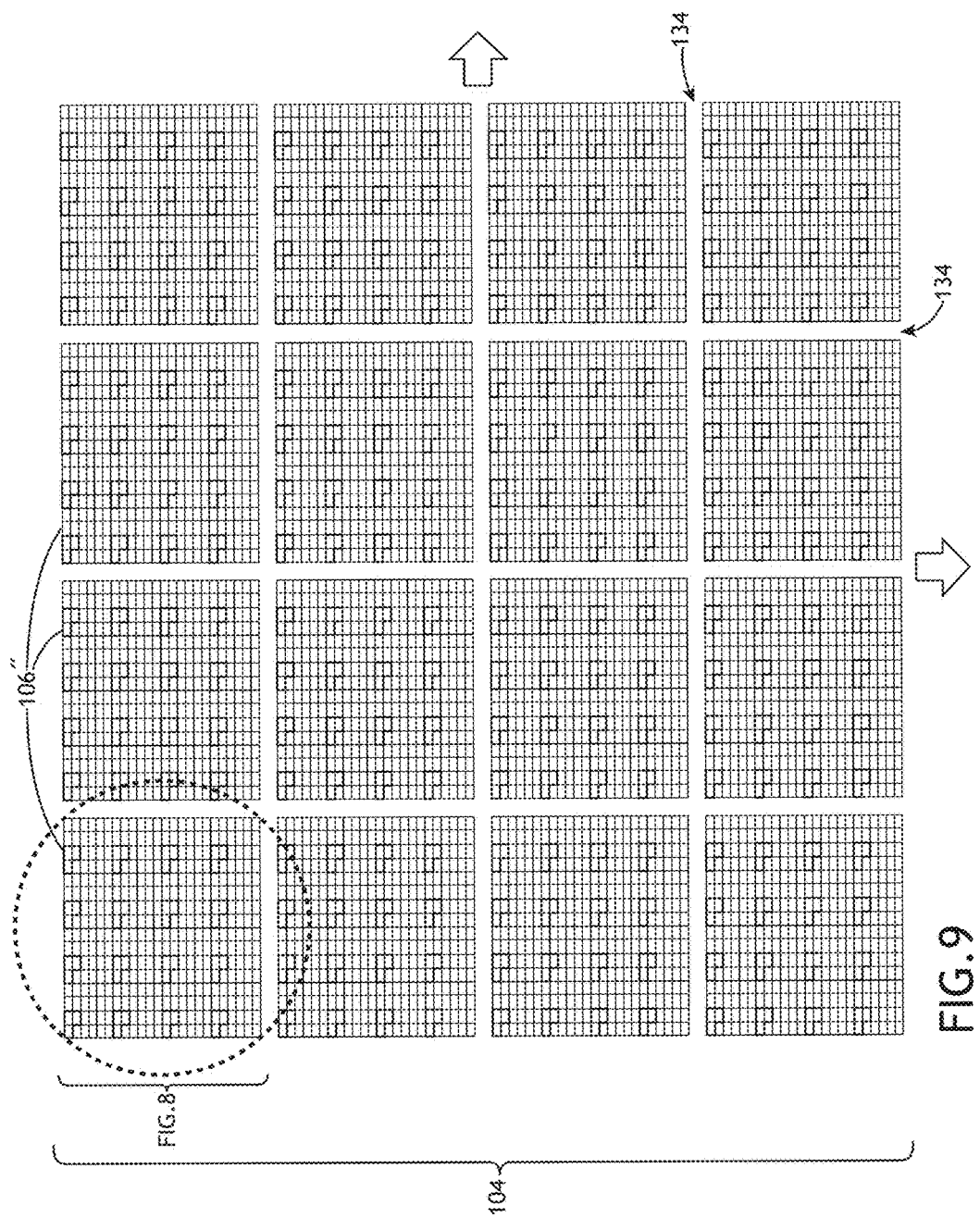
FIG. 9 is an illustration depicting a plurality of macro-pixels of FIG. 8 forming another light switch.

Similar to the way patterns in FIG. 4 are repeated to form the pattern shown in FIG. 5, the position dithered patterns (groupings) illustrated in FIG. 7 may also be repeated and driven identically (redundantly) multiple times to provide a larger pattern shown in FIGS. 8 and 9. It is noted that by repeating (in the x and y directions) and dithering identically driven groupings, issues associated with the aforementioned shifting within a given z-column may be further reduced.

It is contemplated that the various macro-pixel 106 arrangements described herein are feasible with continued advancements in ultra high definition display technologies. As resolutions of ultra high definition displays continue to increase, the light switch 104 may continue to provide more resolution power, which in turn may continue to enhance resolutions and increase angular alignment of the groupings within the columnar 3D pixels formed in the optical stack 108. It is contemplated that the resolutions of the 3D pixels may be enhanced not only in the x and y directions, but also in the z direction by enabling support for more layers, which may be appreciated in various applications.

It is also contemplated that adjacent macro-pixels 106 are not required to abut against each other. In other words, not every individual pixel of the light switch 104 is required to be mapped to an illuminable element in the optical stack 108. As depicted in FIGS. 6 and 9, optional macro-pixel separation areas 134 may be provided between two adjacent macro-pixels 106. While some of these optional macro-pixel separation areas 134 may be defined to provide spacing for certain addressing circuits, others may simply be reserved or unused for various reasons.

It is further contemplated that various techniques may be employed during the manufacture and assembly process to ensure proper alignment of the light switch 104 to the optical stack 108. For instance, the registration of the light switch 104 to the optical stack 108 may be performed during or after assembly through an excitation and sensing process. If misalignment is detected, the light switch 104 may be re-programmed to achieve proper alignment. Alternatively and/or additionally, an optical feedback test during assembly may be utilized to enable a machine to make physical adjustments and to secure the system during the assembly process. It is to be understood that other techniques may also be employed without departing from the broad scope of the inventive concepts disclosed herein.

It is also to be understood that the various macro-pixel 106 arrangements described above are merely exemplary and are not meant to be limiting. It is contemplated that specific implementations and macro-pixel arrangements may vary without departing from the broad scope of the inventive concepts disclosed herein. It is noted, however, for purposes of presentation simplicity, the following descriptions may continue to reference the control groups as control groups 106-1, 106-2, 106-3, . . . 106-n and their corresponding illuminable element groups as illuminable element groups 110-1, 110-2, 110-3, . . . 110-n to explain the operations of the 3D display device 100. It is to be understood that the same principles are applicable to various different macro-pixel 106 arrangements without departing from the broad scope of the inventive concepts disclosed herein.

Figure 10:
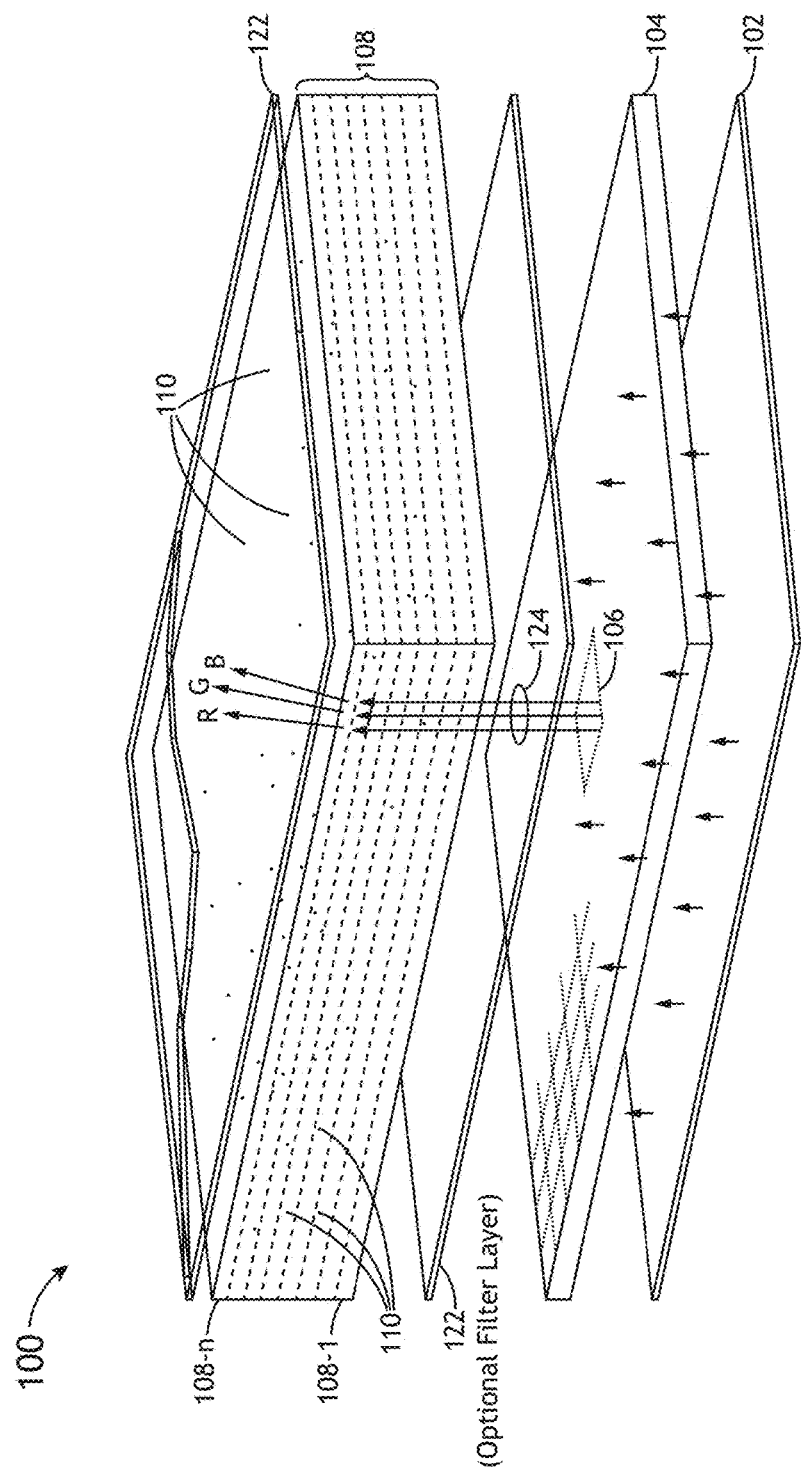
FIG. 10 is an exploded isometric view of a 3D display.

Referring now to FIG. 10, a control group 106-i of macro-pixel 106 is shown to allow light beams 124 to pass through to illuminate (or excite) the illuminable element group 110-i contained within the i-th layer of the optical stack 108. In certain implementations, phosphors may be utilized as the illuminable elements. For instance, each layer 108-i may include a clear substrate, and the phosphor elements 110 (e.g., small phosphor dots, not all of them shown) may be precisely placed or registered on the clear substrate at positions according to a specific 2D-to-3D arrangement. The clear substrate may include high efficiency glass, polymer, sapphire, toughened or tempered glass, clear films or other types of clear medium that may efficiently propagate illumination with limited lateral dispersion. The phosphor elements 110 may be placed on the clear substrate using various deposition processes including gas, chemical bonding, liquid suspension/drying, 3D printing, thermo-bonding, and processes using photo x-ray or e-beam lithography. The assembly process may utilize optical feedback layer registration, and then layers (e.g., 108-1, 108-2, 108-3, . . . 108-n) may then be carefully laminated or fused together to form the optical stack 108, which now contains the phosphor elements 110 suspended therein.

Figure 11:
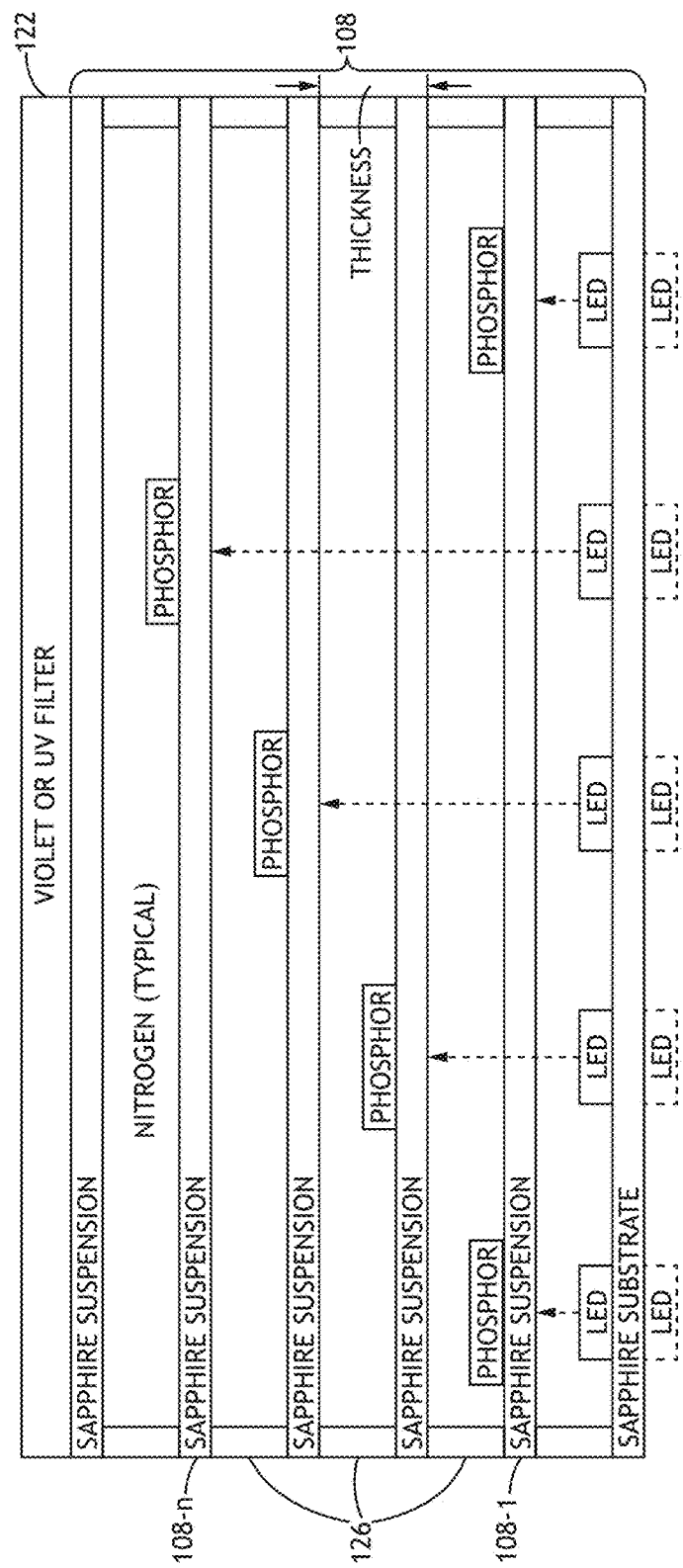
FIG. 11 is a cross sectional view of an optical stack of a 3D display.

Alternatively, the n layers may be stacked using one or more thin/ultra-thin glass or film substrates without being laminated together. As shown in FIG. 11, spacers 126 may be utilized to create prescribed separations with dry nitrogen (or other types of filler gas) filling the separations. Light source(s) may be located either above or below the substrate that supports the stack (the specific reference to LEDs will be described later). During the construction process, the thin layers (e.g., glass or sapphire) may be optically registered to a very high degree of precision. Once aligned, the thin layers may be quickly fused to the spacers 126 by a laser pulse. It is to be understood that whether the n layers are laminated or spaced apart, the objective is to create a 3D volume so that the phosphor elements 110 in different layers are vertically separated. It is contemplated that the vertical separations between two adjacent layers may be configured uniformly in certain implementations, but they may vary according to implementation requirements without departing from the broad scope of the inventive concepts disclosed herein.

Figure 12:
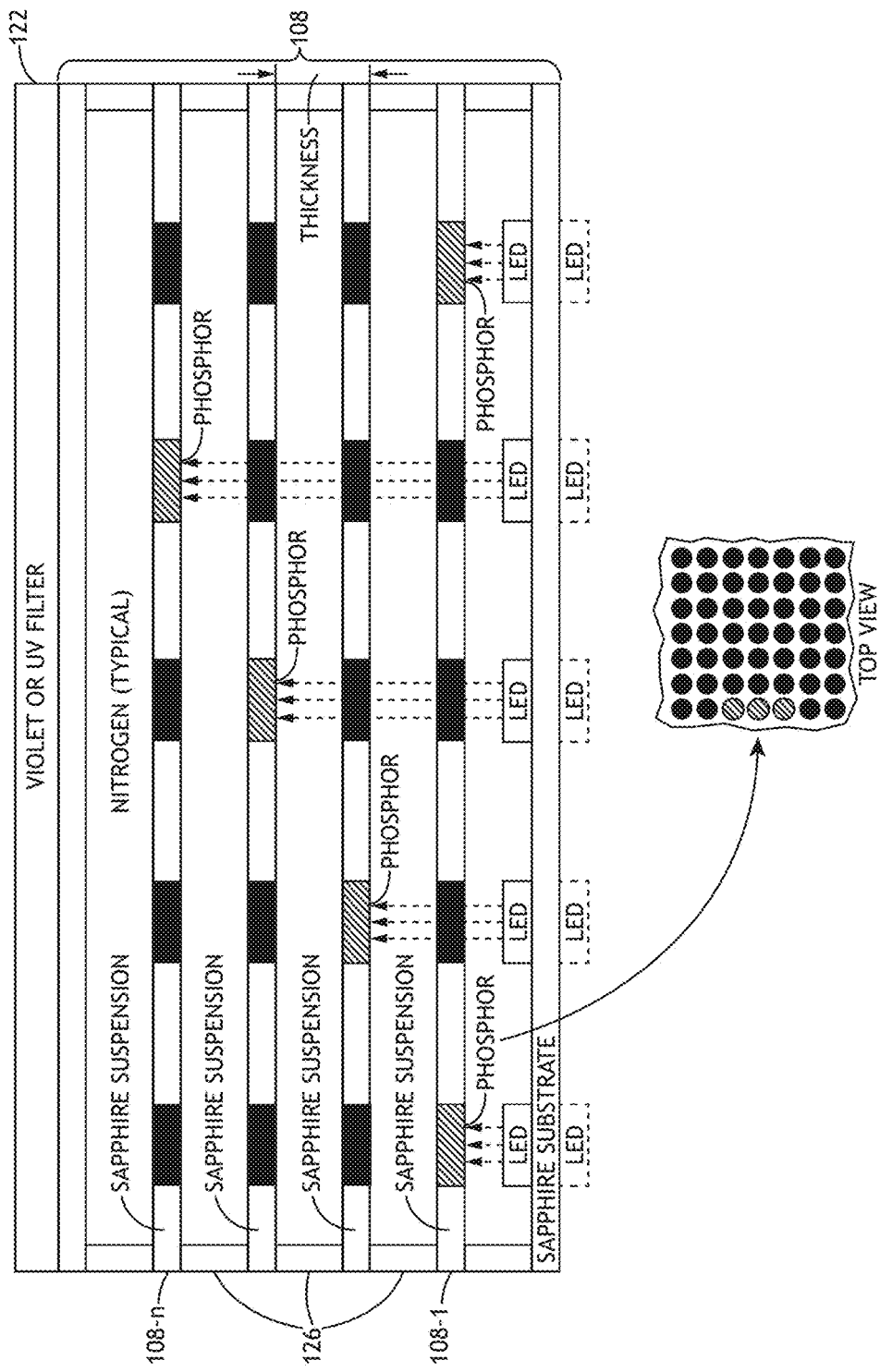
FIG. 12 is a cross section view of another optical stack of a 3D display.

It is contemplated that the phosphor elements 110 may also be embedded within the clear substrate (in addition to, or instead of, being positioned on the clear substrate). For instance, as shown in FIG. 12, laser punched gridded openings may be defined at the various positions within a clear substrate, and phosphor elements may be placed into these openings, effectively allowing the phosphor elements to be embedded within the substrate itself. Additionally, as shown in FIG. 12, similar laser punched gridded openings may be defined in the layers below the phosphor elements as well. These openings may provide certain optical performance advantages. It is contemplated that other techniques may also be utilized to embed the phosphor elements into the substrate without departing from the broad scope of the inventive concepts disclosed herein.

Figure 13:
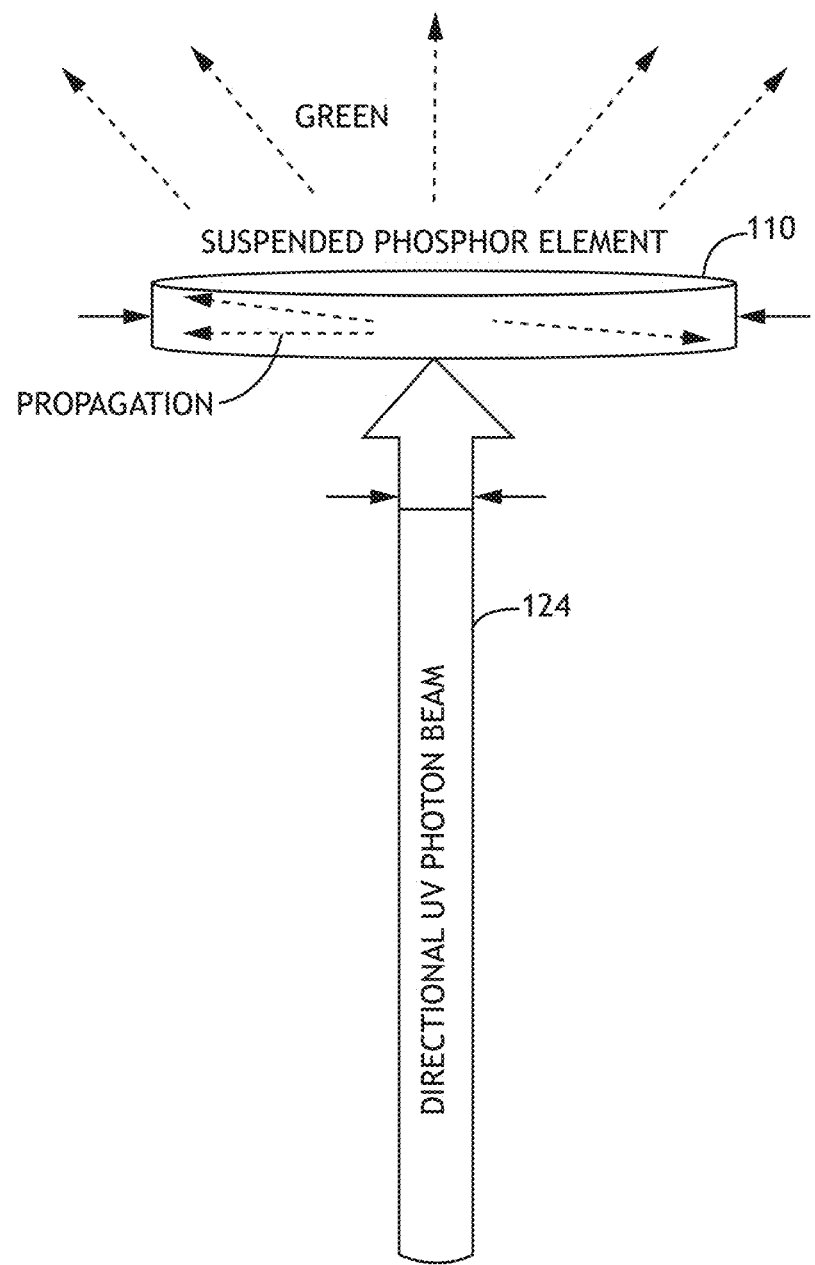
FIG. 13 is an illustration depicting an illuminable element.

It is also contemplated that the size of the phosphor elements 110 may vary without departing from the broad scope of the inventive concepts disclosed herein. In some implementations, as depicted in FIG. 13, a phosphor (natural or engineered re-emissive chemistries) element 110 may extend into regions beyond a beam of light 124 that passes through the light switch 104 to excite the phosphor element 110, allowing lateral light propagation in a phosphor element 110 at a given depth layer and allowing the cross section of the beam of light used to excite the phosphor element 110 to be physically smaller than the phosphor element 110. In some other implementations, the phosphor elements 110 may be configured in manners so that they contribute little or no propagation. It is also contemplated that the shape of the phosphor elements 110 may vary without departing from the broad scope of the inventive concepts disclosed herein. For example, the phosphor elements 110 may be shaped as square, rectangular, hexagonal, pentagonal, circular, or oval shaped elements. In another example, the phosphor elements 110 may be shaped as (or form a segment of) an alphabetic or a numeric character of a printed language or logo. It is contemplated that the phosphor elements 110 may be substantially transparent to the visible spectrum when in the off-state either in its elemental form or as sparsely populated element carried in a transparent base carrier.

It is contemplated that the phosphor elements 110 may be excited using blue, violet or ultra violet (UV) light, extending from approximately 475 nm to 10 nm. In certain embodiments, the light source 102 may be configured to provide violet or UV light toward the optical stack 108 through the light switch 104. As previously described, the light switch 104 may control which phosphor elements 110 suspended within the optical stack 108 may be exposed to the violet or UV light and the intensities of the exposures. Subsequently, upon their exposures to the violet or UV light, each exposed phosphor element 110 may perform a "Stokes shift" (or down shift) from the violet or UV light to a preconfigured color visible to a viewer. It is noted that if all phosphor elements 110 are configured to perform a similar shift, they may form a monochromic 3D image, which may be appreciated in certain applications. Alternatively, the phosphor elements 110 may be arranged in manners capable of producing polychromic (or colored) 3D images.

Figure 14:
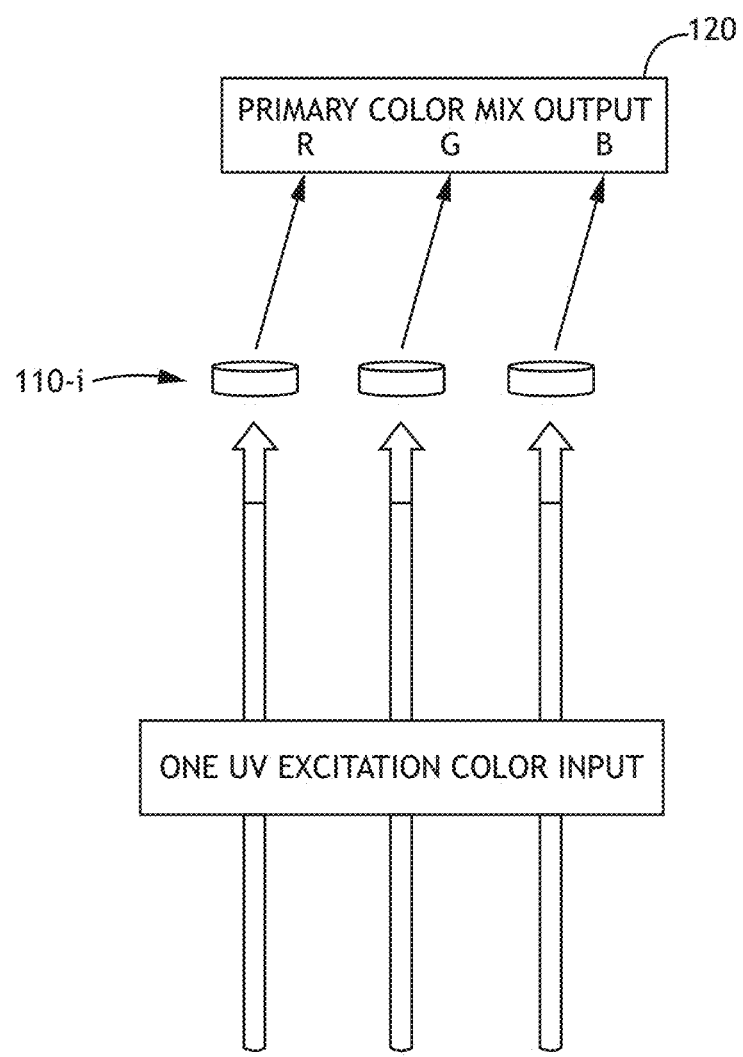
FIG. 14 is an illustration depicting a group of illuminable elements.

To produce polychromic 3D images, for example, each illuminable element group 110-*i* may include a triad of phosphor elements capable of producing primary colors. More specifically, as shown in FIG. 14, each triad of phosphor elements may include a phosphor element capable of producing red, a phosphor element capable of producing green, and a phosphor element capable of producing blue, when illuminated. By configuring each illuminable element group 110-*i* to include a triad of phosphor elements, a mixture of the primary colors can be created to generate a polychromic output 120.

Figure 15:
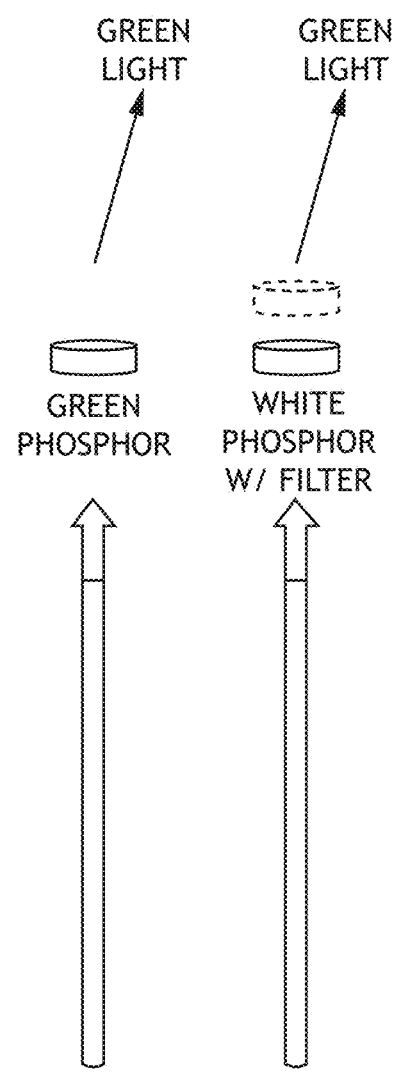
FIG. 15 is an illustration depicting optional configurations for an illuminable element to provide colored light.

It is to be understood that different color-producing phosphor elements are not required in order to produce the polychromic output 120. As shown in FIG. 15, an alternative configuration may utilize different filters or dyes to achieve the same result. This configuration may allow the same type of phosphor elements (e.g., white phosphors) to be utilized. In addition, it is to be understood that the depiction of a triad is merely exemplary. As previously mentioned, the illuminable element group 110-*i* may include more or less phosphor elements without departing from the broad scope of the inventive concepts disclosed herein.

It is contemplated that the combination of utilizing phosphors as illuminable elements and utilizing violet or UV light to selectively excite such illuminable elements may provide several features that may be appreciated. For instance, it allows the light switch 104 to simply control the positions and intensities of the violet or UV beams to excite the phosphor elements 110 without the need to carry any color information. The phosphor elements 110 may then re-emit omnidirectionally when excited, providing a pleasant image viewable from a large viewing angle. Additionally, it is noted that the violet or UV light may have little or no impact on the color range visible to the viewer. Furthermore, as shown in FIG. 10, any scattered violet or UV light may be easily controlled/removed using one or more filters 122 without affecting the visible color range. For example, if the light source 102 provides violet illumination, a simple low-pass cut-off violet filter 122 may be utilized to hide/block any remaining violet light exiting the optical stack 108. Similarly, if the light source 102 provides UV illumination, a UV filter 122 may be utilized.

It is contemplated that the one or more additional filters 122 may also be optionally positioned to filter the light entering the optical stack 108 as well. For example, as shown in FIG. 10, a thin sheet long-pass or high-pass violet or UV filter 122 may be positioned between the light switch 104 and the optical stack 108. This configuration may improve image quality, particularly when the light switch 104 is implemented using an LCD and when the light source 102 provides UV illumination, because using LCD to switch UV illumination may produce very small amounts of downshifted visible light. Placing a filter 122 between the light switch 104 and the optical stack 108 may help clean up the UV beams and prevent these unwanted artifacts from propagating through the optical stack 108 and reaching the viewer. It is to be understood that specific selections of filters may vary based on specific implementations of the light switch 104 and the optical stack 108; materials and bias wavelengths may afford abilities to trade display performance with control of undesired scatter, interaction with materials and Fraunhofer effects, and the types of filters utilized may vary without departing from the broad scope of the inventive concepts disclosed herein.

It is to be understood that while the exemplary implementations described above referenced violet or UV light, such references are not meant to be limiting. The excitation of phosphors may be triggered using light sources including one of a blue light source (e.g., an InGaN-based light source having an emission wavelength of approximately 445 nm, or 473, 474 nm derived from frequency doubling 946 nm), a far blue light source, a violet light source (e.g., a GaN-based light source having an emission wavelength of approximately 404-405 nm), a far violet light source, an ultraviolet light source (e.g., a light source having an emission wavelength of approximately 265-410 nm), as well as other light sources (including visible light) without departing from the broad scope of the inventive concepts disclosed herein. It is contemplated that electromagnetic waves beyond shortwave ultraviolet and matrixed emission sources may also become technically feasible.

It is contemplated that the light source may be selected based on several factors, including the intended operating environment for the display. For instance, violet or far violet may be an option where UV is less economical or for other reasons not as acceptable. However, violet or far visible violet may have certain limitations in a flight deck environment due to certain visibility concerns. UV beams, on the other hand, are high energy beams and provide much shorter relative wavelengths, allowing finer beam projections to suspended pixels and better control of tighter Fraunhofer interference lines (which may result in some display system architectures). However, UV beams may be more destructive and may shorten the life of the display in certain operating conditions.

It is also to be understood that while the exemplary implementations described above referenced phosphors as the illuminable elements 110, such references are not meant to be limiting. It is contemplated that compounds that exhibit the phenomenon of luminescence, and particularly compounds that may perform a spectrum shift (e.g., a down shift, or "Stokes shift", or an up shift) from an invisible light (e.g., UV light) to a visible light (e.g., white or colored light), may be utilized. Such compounds may include, for example, phosphors, phosphor blends, photoluminecent materials, rare earth phosphors, a Eu-doped photoluminecent metal sulfide, garnet florescent chemistries, as well as other florescent chemistries and violet/UV excitable re-emissive particles, including certain gas materials and/or mixtures. It is also contemplated that compounds that are reflective, partially translusive, or otherwise excitable when illuminated may also be utilized without departing from the broad scope of the inventive concepts disclosed herein.

Figure 16:
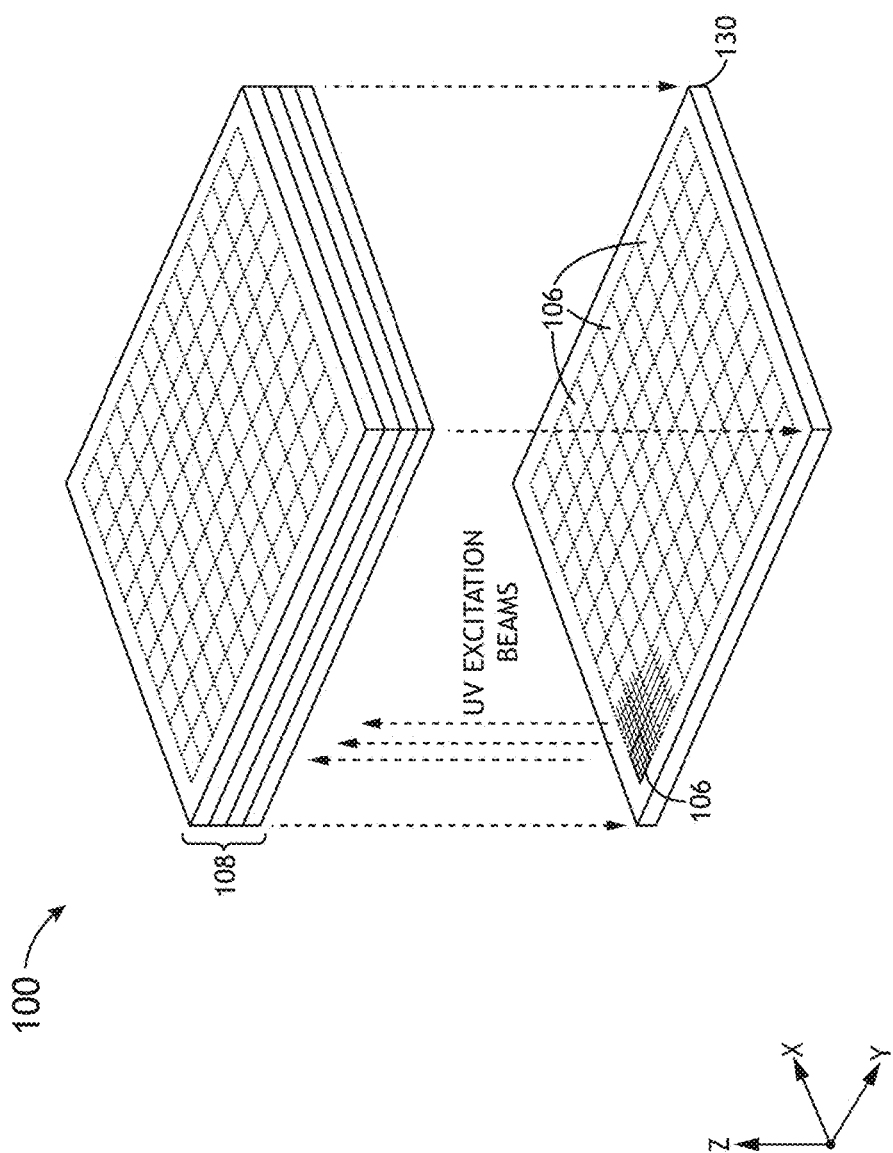
FIG. 16 is an exploded isometric view of a 3D display.

Referring now to FIG. 16, another embodiment of the 3D display device 100 in accordance with the inventive concepts disclosed herein is shown. It is noted that a two-dimensional light matrix 130 may be utilized instead of using a combination of the light source 102 and the light switch 104 (as depicted in FIG. 1). The light matrix 130 may be implemented using any type of emissive display devices, including light projection devices and light-emitting diodes (LEDs). It is contemplated that LEDs suitable for implementing the light matrix 130 may include micro LEDs, quantum dot LEDs, nano LEDs, crystal LEDs, monolithic laser LEDs, organic LEDs or the like, and that the illumination intensity of each individually light-emitting element of the light matrix 130 may be individually addressable. It is contemplated that utilizing emissive display devices in this manner may allow the 3D display device 100 to be flexible. It is also noted that the LEDs may either be front or rear driven through a clear substrate (mounting platform, as shown in the cross-sectional view illustrated in FIG. 11) with directional excitation beams propagating orthogonally towards the optical stack 108.

Similar to the light switch 104 previously described, the light-emitting elements of the light matrix 130 may be grouped into a plurality of macro-pixels 106 to facilitate 2D-to-3D mapping, with a difference being that the individual light-emitting elements of the light matrix 130 may actively emit excitation beams at adjustable intensities toward the optical stack 108 as opposed to passively letting the excitation beams through. Otherwise, the control logic of using a two-dimensional switching mechanism to control z-axis depth in a three-dimensional volume may function in the same manner as previously described. It is noted, therefore, both the light matrix 130 and the light switch 104 may be referred to generally as optical controllers in accordance with the inventive concepts disclosed herein.

Figure 17:
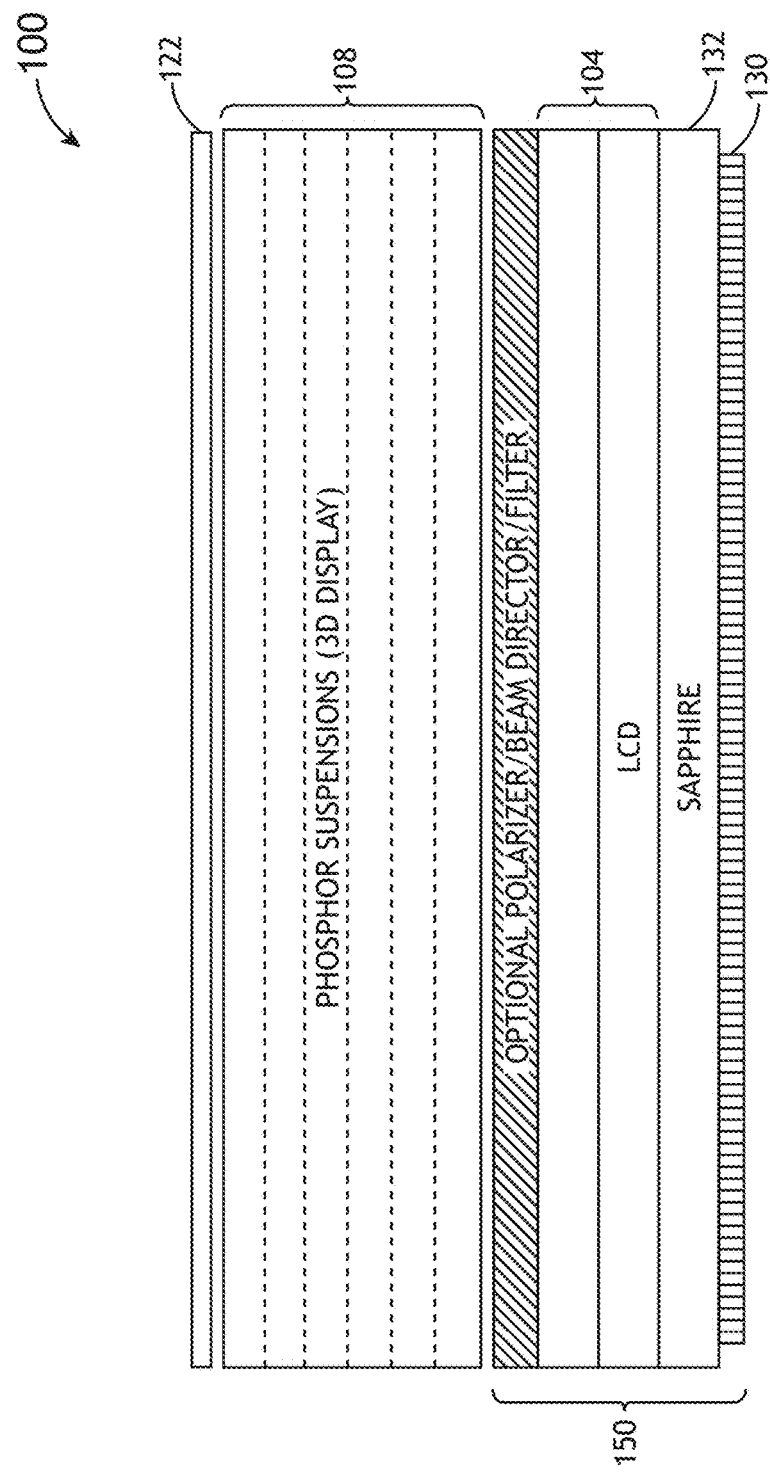
FIG. 17 is a cross sectional view of a 3D display.

Referring now to FIG. 17, still another embodiment of the 3D display device 100 in accordance with the inventive concepts disclosed herein is shown. It is noted that an optical controller 150 may include a light matrix 130 in conjunction with a light switch 104. More specifically, the light matrix 130 (e.g., UV LEDs) may serve as a light source behind the light switch 104 (e.g., an LCD), and the light matrix 130, the light switch 104, or both, may be utilized to facilitate 2D-to-3D mapping. In certain implementations, the light matrix 130 may be chemically conducive to direct epitaxial growth on a sapphire substrate 132, which on the reverse side may be engaged with the light switch 104, thereby producing a more efficient optical interface between the light matrix 130 and the light switch 104. As mentioned previously, the LEDs may be front mounted with directional LED optical emissions unimpeded by any optical structures until the beams reach suspended re-emissive particles. Alternatively and/or additionally, the LEDs may be rear mounted and driven through a clear substrate.

It is contemplated that utilizing the light matrix 130 in conjunction with the light switch 104 may provide additional functionalities that may be appreciated. For instance, the LEDs of the light matrix 130 may be configured to act as sensors to detect light reflected from a finger, latent emissions from the phosphors, a stylus or the like, allowing the 3D display device 100 to support touch sensing. It is contemplated that other touch sensing technologies may also be utilized without departing from the broad scope of the inventive concepts disclosed herein.

Figure 18:
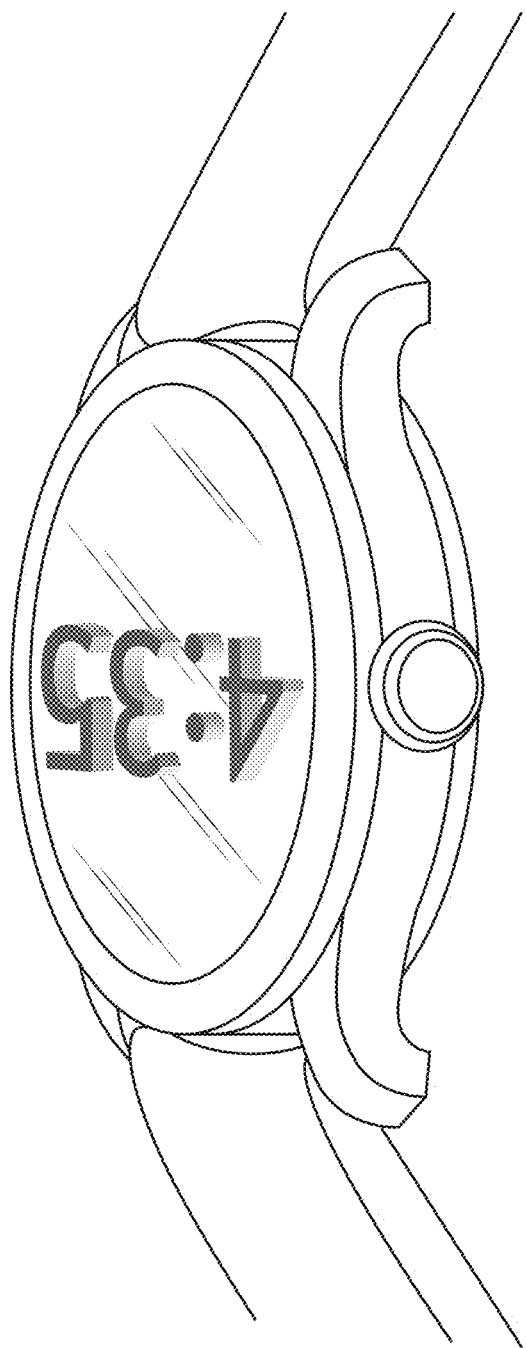
FIG. 18 is an illustration depicting a wearable device utilizing a 3D display.
Figure 19:
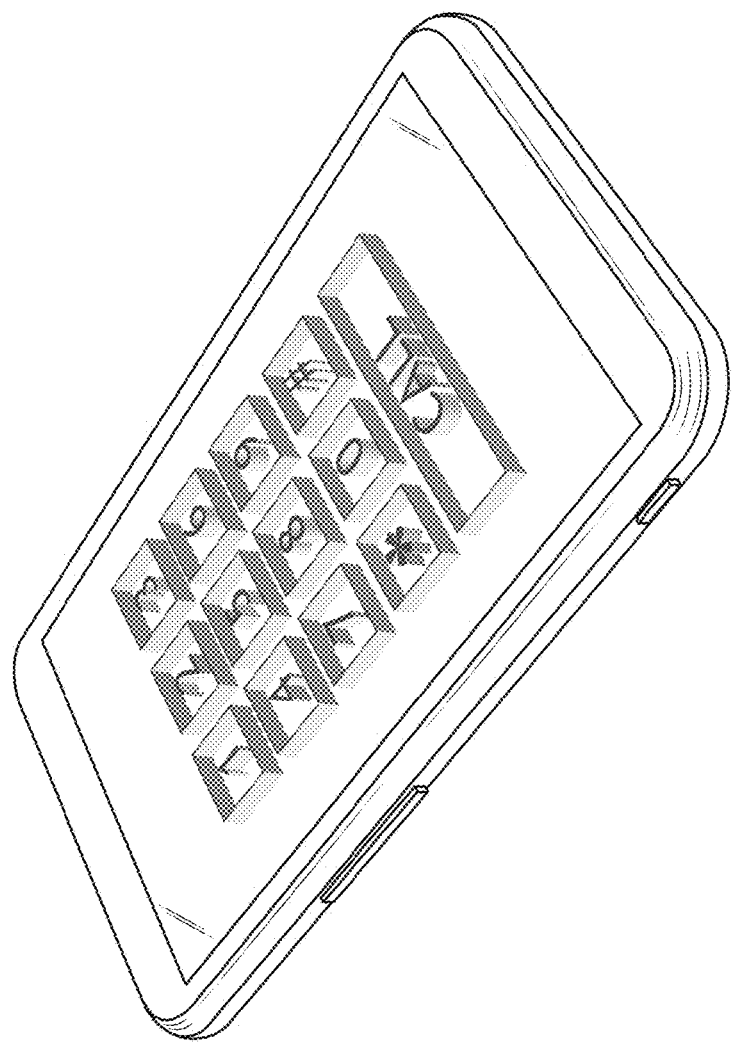
FIG. 19 is an illustration depicting a communication device utilizing a 3D display.
Figure 20:
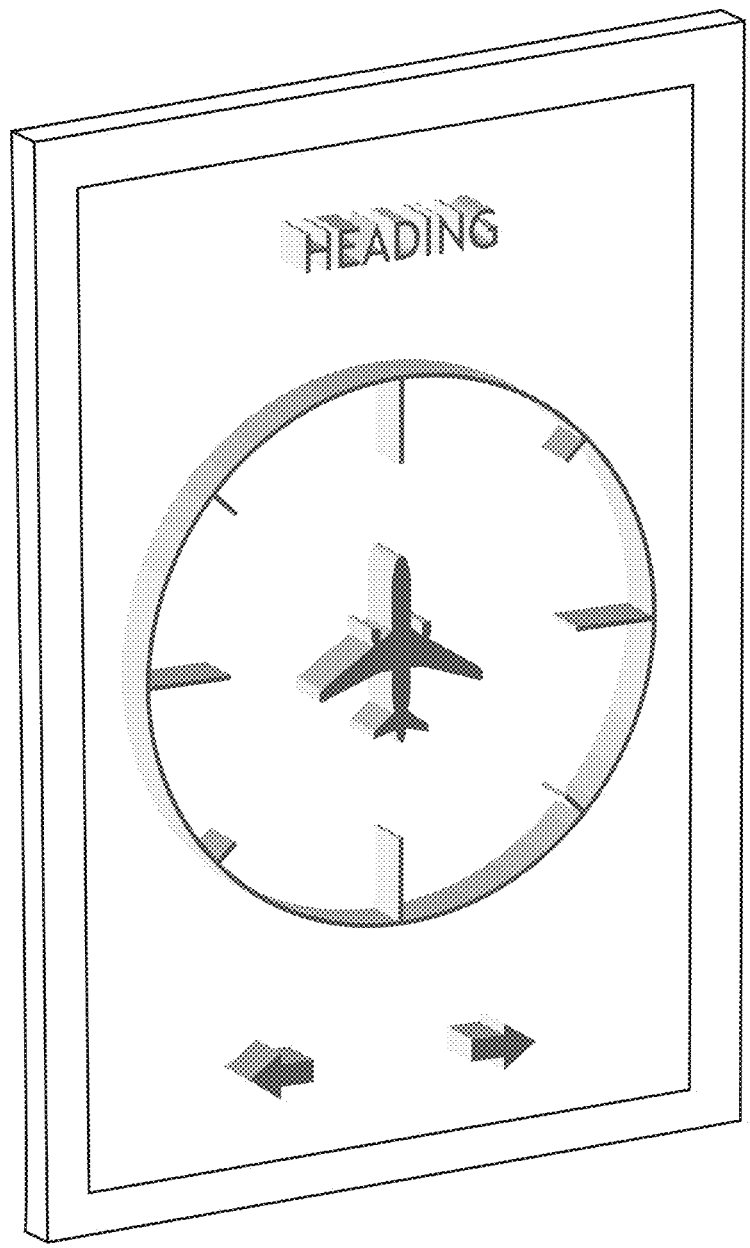
FIG. 20 is an illustration depicting an avionics device utilizing a 3D display.
Figure 21:
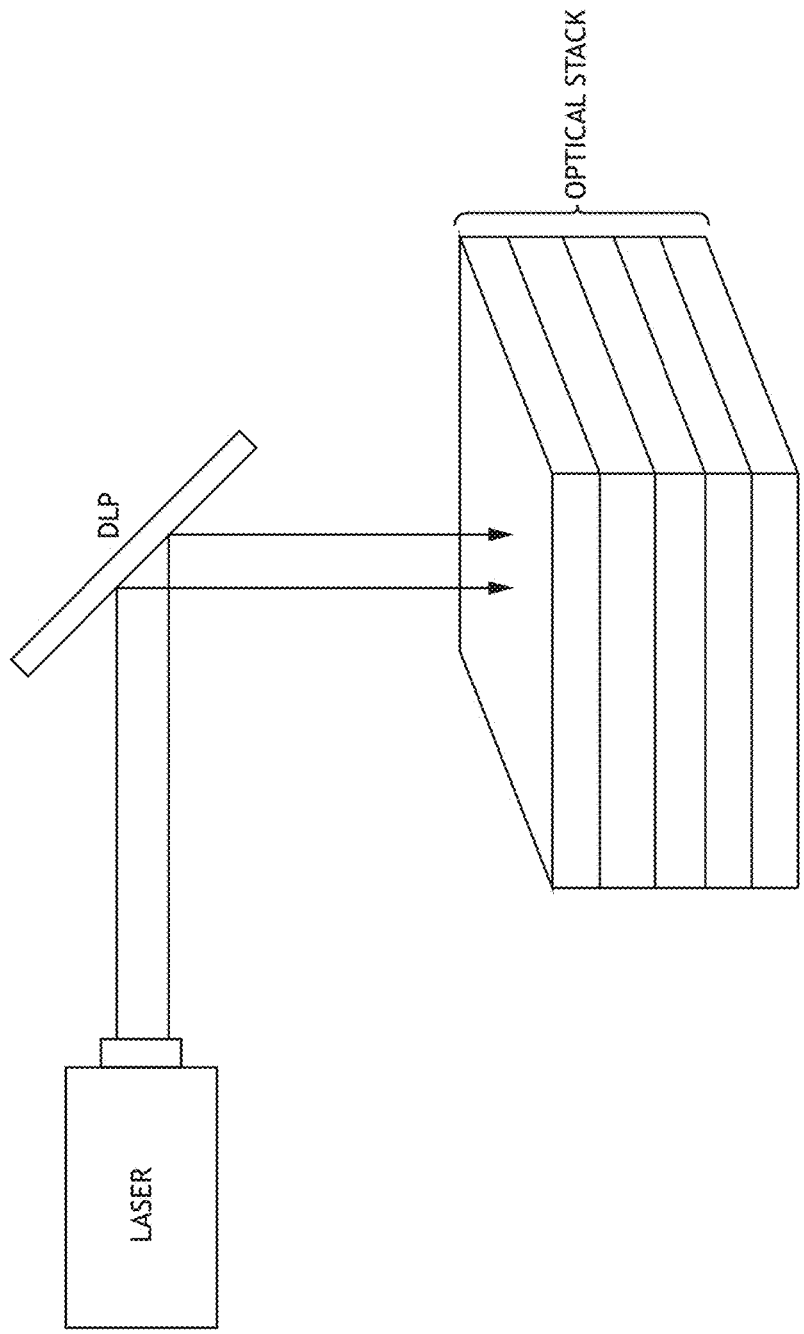
FIG. 21 is an illustration depicting a projection device utilizing a 3D display.
Figure 22:
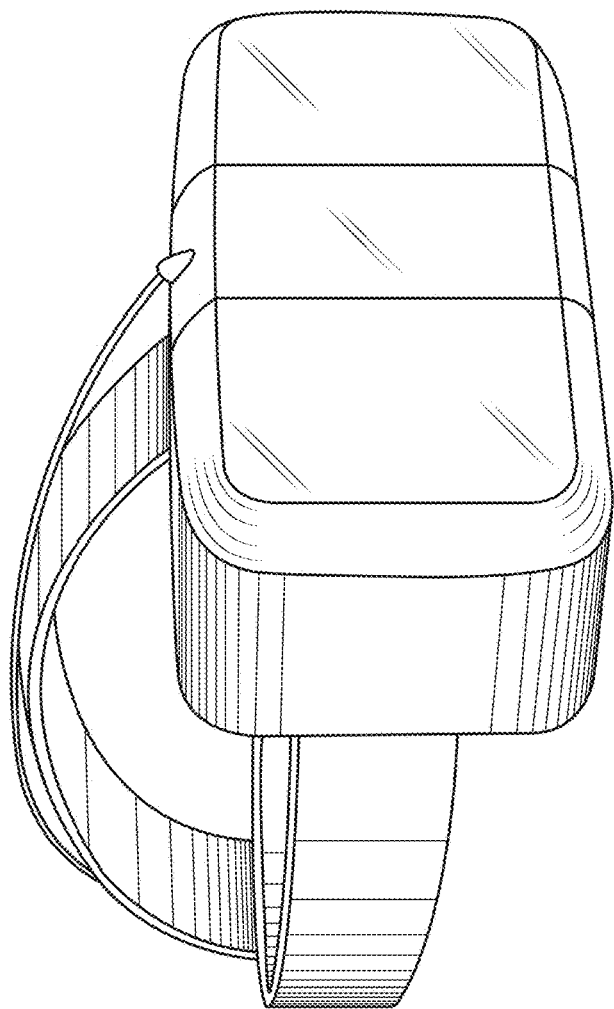
FIG. 22 is an illustration depicting a head mount device utilizing a 3D display.

It is contemplated that the 3D display devices in accordance with the inventive concepts disclosed herein may be implemented or scaled to a variety of sizes and formats. For instance, the 3D display devices may be utilize in wearable devices (e.g., a watch depicted in FIG. 18), in personally communication devices (e.g., a phone depicted in FIG. 19), or in various other types of mobile/portable displays, computer displays, television displays, and the like. The 3D display devices may also be utilized as automotive or avionics displays (e.g., flight deck displays) as depicted in FIG. 20. Additionally, the 3D display devices may benefit from various projection techniques that may be capable of producing pixelated directive light (e.g., digital light processing shown in FIG. 21) to provide large scale 3D displays for projection displays, virtual reality displays, theater displays, situational awareness and room displays. Also shown in FIG. 21 is that the optical controller may not be required to be positioned at the back (or the bottom) of the optical stack. In other words, the optical controller may be configured to drive the optical stack from the side of the optical stack without departing from the broad scope of the inventive concepts disclosed herein. Furthermore, as depicted in FIG. 22, the 3D display devices may be implemented in head mount displays and various other types of displays without departing from the broad scope of the inventive concepts disclosed herein.

Figure 23:
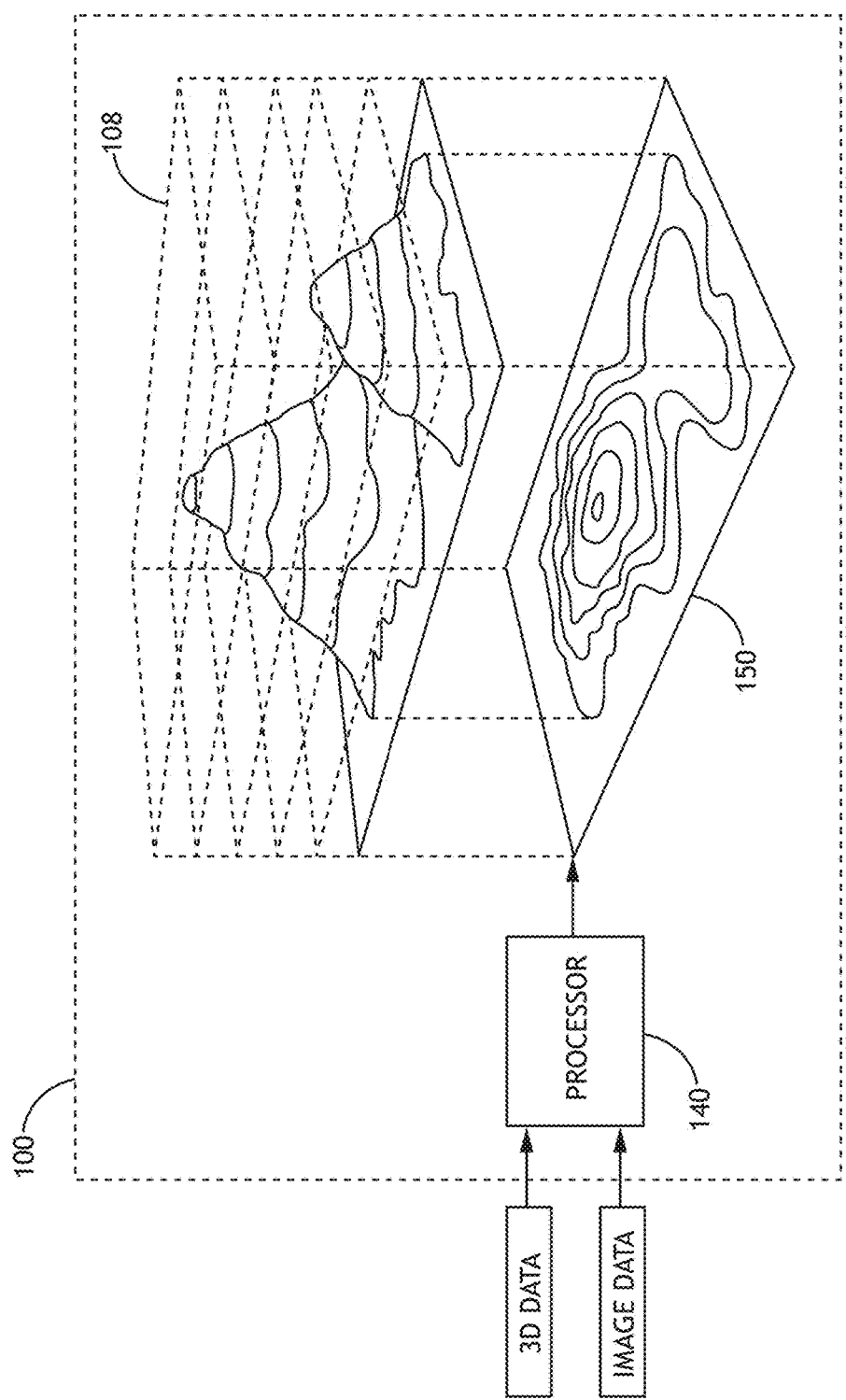
FIG. 23 is an illustration depicting a 3D display in operation.

FIG. 23 is an illustration depicting a 3D display device 100 in operation. More specifically, the 3D display device 100 may include a graphics processor 140. Display data may be provided to the graphics processor via a data interface (e.g., parallel, serial, optical, wireless, or other types of interface). The display data may include encoding for both 3D layer data and image data. The 3D data may be presented as vector quantized (VQ) data (e.g., VQ triangles), contour lines, 3D vectors, or various other data formats capable of carrying 3D spatial information. The image data, on the other hand, may be presented as still pictures, moving pictures, or various other data formats capable of carrying visual information. The 3D data and the image data may be provided to the graphics processor 140 separately, sequentially or simultaneously. Alternatively, the 3D data and the image data may be provided to the graphics processor 140 in an interlaced manner similar to that disclosed in "Systems and Methods for Transmission of Synchronized Physical and Visible Images for Three Dimensional Display," U.S. patent application Ser. No. 14/676,014 filed on Apr. 1, 2015, which is incorporated herein by reference. In still another example, the display data provided to the graphics processor 140 may include a video sequence (e.g., a Motion Pictures Expert Group, or MPEG video sequence). Such a video sequence may include 3D object information enabling objects within a video stream to be specified or automatically directed to a particular z-axis depth (or layer) in the 3D display device 100.

The graphics processor 140 may be implemented as dedicated processing units, application-specific integrated circuits (ASIC), integrated components of existing hardware or firmware configured to control operations of the 3D display device 100, or various other types of processing units without departing from the broad scope of the inventive concepts disclosed herein. The graphics processor 140 may process the 3D data and the image data received in order to control an optical controller 150 accordingly. The optical controller 150, which may include a light switch and/or a light matrix (as previously described), may in turn control the formation of a 3D image within an optical stack 108 of the 3D display device 100 utilizing the techniques in accordance with the inventive concepts disclosed herein.

It is contemplated that the 3D display device 100 may be configured to function in absence of either the 3D data or the image data. For instance, if the 3D data is missing (whether intentional or not), the optical controller 150 may default to a particular layer setting (e.g., default to the top layer) of the optical stack 108 to form a 2D image based on solely on the image data. Similarly, if the image data is missing (whether intentional or not), the optical controller 150 may default to a particular color setting (e.g., exciting each triads with equal intensity) but still present the 3D image according to the 3D data. It is contemplated that providing continued operation without requiring both the 3D data and the image data to be present may be appreciated in certain applications.

Figure 24:
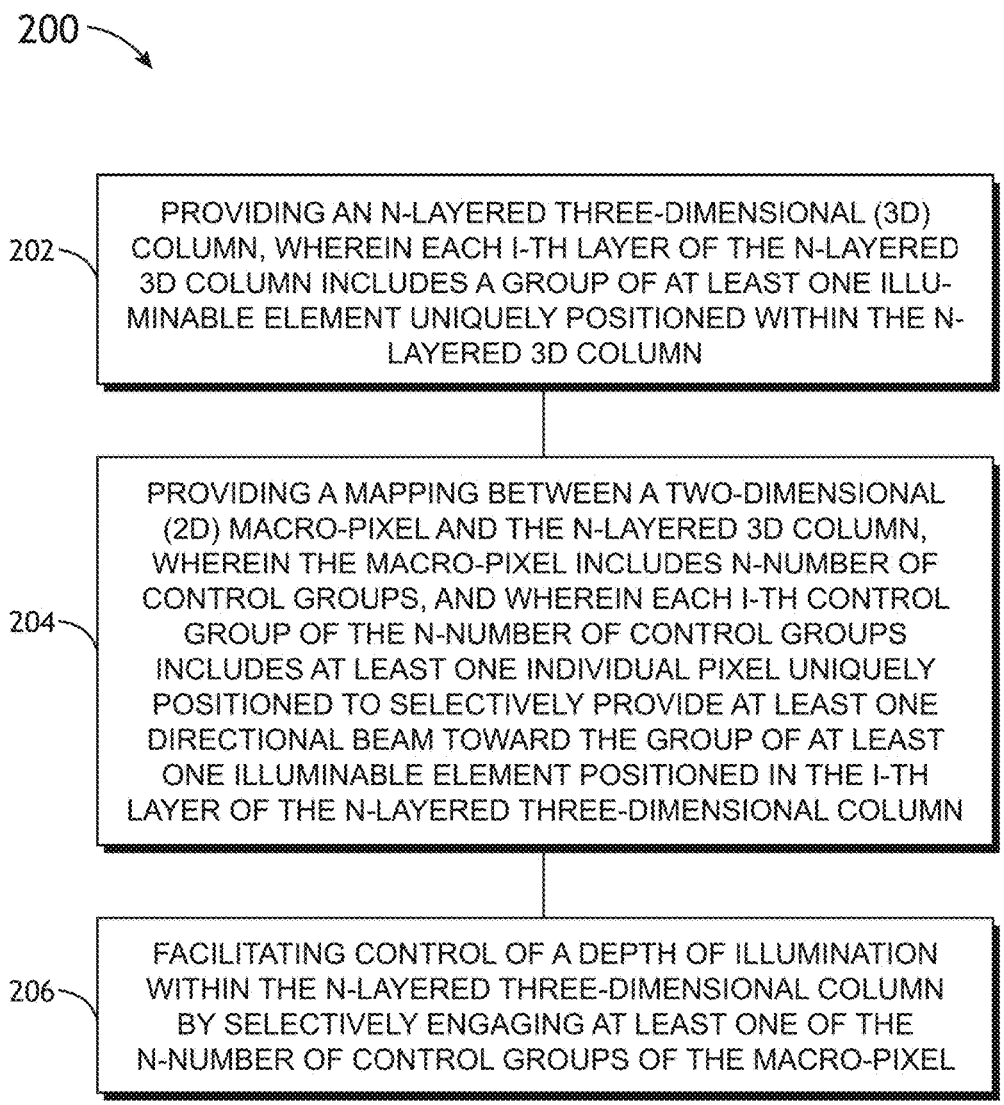
FIG. 24 is a flow diagram depicting a method for providing a 3D representation.

Referring now to FIG. 24, an embodiment of a method 200 for providing a true 3D representation is shown. As shown in FIG. 24, one or more n-layered 3D column (also referred to as a z-column in the description above) may be provided in a step 202. As previously described, each i-th layer of the n-layered 3D column may include a group of at least one illuminable element uniquely positioned within the n-layered 3D column. Each n-layered 3D column may uniquely correspond to a 2D macro-pixel, and a mapping between the 2D macro-pixel and the n-layered 3D column may be provided (or defined) in a step 204. More specifically, the macro-pixel may include n-number of control groups, and each i-th control group of the n-number of control groups may include at least one individual pixel uniquely positioned to selectively provide at least one directional beam toward the group of at least one illuminable element positioned in the i-th layer of the n-layered 3D column. It is contemplated that the various macro-pixel arrangements previously described may be utilized to provide the mapping. It is to be understood that the specific arrangement may vary without departing from the broad scope of the inventive concepts disclosed herein.

As previously described, the mapping between each 2D macro-pixel and its corresponding n-layered 3D column enables control of a depth of illumination within the n-layered 3D column. More specifically, by selectively engaging one of the n-number of control groups of the 2D macro-pixel (e.g., the i-th control group), the i-th control group may selectively provide one or more directional beams toward the group of at least one illuminable element positioned in the i-th layer of the n-layered 3D column, effectively setting the depth of illumination at the i-th layer within the n-layered 3D column. It is contemplated that by setting the various n-layered 3D columns in this manner, an image with varying depth of illumination may be formed, providing a true 3D representation.

It is to be understood that the present disclosure may be conveniently implemented in forms of a software, hardware or firmware package. Such a package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is to be understood that embodiments of the inventive concepts described in the present disclosure are not limited to any underlying implementing technology. Embodiments of the inventive concepts of the present disclosure may be implemented utilizing any combination of software and hardware technology and by using a variety of technologies without departing from the broad scope of the inventive concepts or without sacrificing all of their material advantages.

It is to be understood that the specific order or hierarchy of steps in the processes disclosed is an example of exemplary approaches. It is to be understood that the specific order or hierarchy of steps in the processes may be rearranged while remaining within the broad scope of the present disclosure. The accompanying method claims present elements of the various steps in a sample order, and are not meant to be limited to the specific order or hierarchy presented.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form herein before described being merely an explanatory embodiment thereof, it is the intention of the following claims to encompass and include such changes.

What is claimed is:

1. A display, comprising:
   an n-layered three-dimensional (3D) column, wherein each i-th layer of the n-layered 3D column includes a group of at least one illuminable element uniquely positioned within the n-layered 3D column, wherein each of the at least one illuminable element includes a luminescence material including at least one of a phosphor, a phosphor blend, a rare earth phosphor, or a photoluminescent metal sulfide; and
   a two-dimensional (2D) macro-pixel configured to control a depth of illumination within the n-layered 3D column, wherein the macro-pixel includes n-number of control groups, and wherein each i-th control group of the n-number of control groups includes at least one individual pixel uniquely positioned to selectively provide at least one directional beam toward the group of at least one illuminable element positioned in the i-th layer of the n-layered 3D column, thereby allowing the macro-pixel to control the depth of illumination within the n-layered 3D column by selectively engaging at least one of the n-number of control groups of the macro-pixel.

2. The display of claim 1, wherein the group of at least one illuminable element positioned within each i-th layer of the n-layered 3D column re-emits visible light only when illuminated.

3. The display of claim 1, wherein the group of at least one illuminable element positioned within each i-th layer of the n-layered 3D column includes a plurality of colorized illuminable elements.

4. The display of claim 3, wherein each i-th control group of the macro-pixel includes a plurality of pixels uniquely positioned to selectively provide a plurality of directional beams toward the plurality of colorized illuminable elements positioned in the i-th layer of the n-layered 3D column.

5. The display of claim 1, wherein each i-th layer of the n-layered 3D column includes a clear substrate with illuminable elements positioned thereon.

6. The display of claim 1, wherein the at least one directional beam is at least one of: a blue beam, a violet beam, and an ultra violet beam.

7. The display of claim 1, further comprising:
   at least one filter configured to filter at least one of: a light entering the n-layered 3D column and a light exiting the n-layered 3D column.

8. The display of claim 1, wherein, for each i-th layer of the n-layered 3D column, the group of at least one illuminable element is a group of at least three illuminable elements configured to generate a polychromic output.

9. A display, comprising:
   an n-layered optical stack defining a plurality of n-layered three-dimensional (3D) columns, wherein each i-th layer of each particular n-layered 3D column includes a group of at least one illuminable element uniquely positioned within each particular n-layered 3D column, wherein each of the at least one illuminable element includes a luminescence material including at least one of a phosphor, a phosphor blend, a rare earth phosphor, or a photoluminescent metal sulfide;
   an optical controller including a plurality of two-dimensional (2D) macro-pixels, each particular macro-pixel uniquely corresponds to a particular n-layered 3D column of the n-layered optical stack and is configured to control a depth of illumination within the particular n-layered 3D column, wherein each particular macro-pixel includes n-number of control groups, and wherein each i-th control group of each particular macro-pixel includes at least one individual pixel uniquely positioned to selectively provide at least one directional beam toward the group of at least one illuminable element positioned in the i-th layer of the particular n-layered 3D column that uniquely corresponds to the particular macro-pixel, thereby allowing each particular macro-pixel to control the depth of illumination within the particular n-layered 3D column that uniquely corresponds to the particular macro-pixel by selectively engaging at least one of the n-number of control groups of that particular macro-pixel; and at least one filter configured to filter at least one of: a light entering the n-layered optical stack and a light exiting the n-layered optical stack.

10. The display of claim 9, wherein the depth of illumination within each particular n-layered 3D column is controlled to render a 3D image with varying depth settings.

11. The display of claim 9, wherein the optical controller includes a 2D array of individual pixels, and wherein each macro-pixel of the optical controller is formed based on a logical grouping of a plurality of individual pixels.

12. The display of claim 11, wherein each particular individual pixel within each macro-pixel is configured to control an intensity of the directional beam passing through that particular individual pixel.

13. The display of claim 11, wherein each particular individual pixel within each macro-pixel is configured to control an intensity of the directional beam emitted by that particular individual pixel.

14. The display of claim 9, wherein the group of at least one illuminable element positioned within each i-th layer of each particular n-layered 3D column re-emits visible light only when illuminated.

15. The display of claim 9, wherein the group of at least one illuminable element positioned within each i-th layer of each particular n-layered 3D column includes a plurality of colorized illuminable elements.

16. The display of claim 15, wherein each i-th control group of each particular macro-pixel includes a plurality of pixels uniquely positioned to selectively provide a plurality of directional beams toward the plurality of colorized illuminable elements positioned in the i-th layer of the particular n-layered 3D column that uniquely corresponds to the particular macro-pixel.

17. The display of claim 9, wherein each i-th layer of the n-layered optical stack includes a clear substrate with illuminable elements positioned thereon.

18. The display of claim 9, wherein the luminescence material is configured to perform a Stokes shift when illuminated.

19. The display of claim 9, wherein the directional beam is at least one of: a blue beam, a violet beam, and an ultra violet beam.

20. A method, comprising:
providing an n-layered three-dimensional (3D) column, wherein each i-th layer of the n-layered 3D column includes a group of at least one illuminable element uniquely positioned within the n-layered 3D column, wherein each of the at least one illuminable element includes a luminescence material including at least one of a phosphor, a phosphor blend, a rare earth phosphor, or a photoluminescent metal sulfide;
providing a mapping between a two-dimensional (2D) macro-pixel and the n-layered 3D column, wherein the macro-pixel includes n-number of control groups, and wherein each i-th control group of the n-number of control groups includes at least one individual pixel uniquely positioned to selectively provide at least one directional beam toward the group of at least one illuminable element positioned in the i-th layer of the n-layered 3D column; and
facilitating control of a depth of illumination within the n-layered 3D column by selectively engaging at least one of the n-number of control groups of the macro-pixel.

* * * * *